US012566123B2

(12) United States Patent
Roberts et al.

(10) Patent No.: US 12,566,123 B2
(45) Date of Patent: Mar. 3, 2026

(54) METHOD AND SYSTEMS FOR CHARACTERIZING AND ENCODING A LIGHT DETECTION SYSTEM

(71) Applicant: Becton, Dickinson and Company, Franklin Lakes, NJ (US)

(72) Inventors: David Roberts, San Jose, CA (US); Peter Ludington Mage, Goleta, CA (US); Shreyas Bhaban, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 56 days.

(21) Appl. No.: 17/512,105

(22) Filed: Oct. 27, 2021

(65) Prior Publication Data

US 2022/0136956 A1     May 5, 2022

Related U.S. Application Data

(60) Provisional application No. 63/107,701, filed on Oct. 30, 2020.

(51) Int. Cl.
*G01N 15/10*     (2024.01)
*G01J 1/08*     (2006.01)
(Continued)

(52) U.S. Cl.
CPC ........... *G01N 15/1012* (2013.01); *G01J 1/08* (2013.01); *G01N 2015/1402* (2013.01); *G01N 2015/1438* (2013.01)

(58) Field of Classification Search
CPC ................................................. G01N 15/1012
See application file for complete search history.

(56) References Cited

U.S. PATENT DOCUMENTS 5,229,838 A * 7/1993 Ganz .................... G01N 21/274
                                                  250/252.1
5,684,585 A * 11/1997 Girvin ................ G01N 15/1012
                                                  356/336
(Continued)

FOREIGN PATENT DOCUMENTS

CN     107995950 A1     5/2018
EP     4121737 A1     1/2023
(Continued)

OTHER PUBLICATIONS

Giesecke, Claudia, et al. "Determination of background, signal-to-noise, and dynamic range of a flow cytometer: a novel practical method for instrument characterization and standardization." Cytometry Part A 91.11 (2017): 1104-1114. (Year: 2017).*

*Primary Examiner* — Rufus L Phillips
(74) *Attorney, Agent, or Firm* — Khin K. Chin; Bret E. Field; BOZICEVIC, FIELD & FRANCIS LLP

(57) ABSTRACT

Aspects of the present disclosure include methods for determining a parameter of a photodetector (e.g., a photodetector in a particle analyzer). Methods according to certain embodiments include detecting light from a light source with a photodetector for a first predetermined time interval, detecting a step signal with the photodetector, the step signal indicating a change in a parameter of the light source or a parameter of the photodetector, detecting light from the light source for a second predetermined time interval, integrating data signals over the first predetermined time interval and the second predetermined time interval and determining one or more parameters of the photodetector based on the integrated data signals. Systems (e.g., particle analyzers) having a light source and a photodetector for practicing the subject methods are also described. Non-transitory computer readable storage medium having instructions stored thereon
(Continued)

$V_1$     $V_2$     $V_3$ $t_3$  $t_3$  $t_3$ $t_2$  $t_2$  $t_2$ $t_1$  $t_1$  $t_1$

First Irradiation Interval

Step Signal with change in frequency of pulses indicating an increase in light intensity Second Irradiation Interval for determining a parameter of a photodetector according to the subject methods is also provided.

14 Claims, 12 Drawing Sheets

(51) Int. Cl.
    *G01N 15/14*         (2024.01)
    *G01N 15/1434*     (2024.01)

(56)         References Cited

U.S. PATENT DOCUMENTS

| | | | |
|---|---|---|---|
| 5,715,048 | A | 2/1998 | Taylor |
| 5,772,588 | A | 6/1998 | Miwa et al. |
| 5,909,278 | A * | 6/1999 | Deka .................. G01J 3/4406 |
| | | | 356/73 |
| 6,573,696 | B1 * | 6/2003 | Sahner ............... G01N 15/1429 |
| | | | 324/76.16 |
| 7,523,637 | B2 | 4/2009 | Roth et al. |
| 2005/0001142 | A1 | 1/2005 | Lauffenburger et al. |
| 2009/0071225 | A1 * | 3/2009 | Schilffarth ......... G01N 15/0205 |
| | | | 73/1.02 |

| | | | |
|---|---|---|---|
| 2011/0178581 | A1 * | 7/2011 | Haber ................... G01J 3/0235 |
| | | | 607/88 |
| 2012/0140231 | A1 | 6/2012 | Knox et al. |
| 2012/0229798 | A1 * | 9/2012 | Mocnik ................ G01N 21/274 |
| | | | 356/338 |
| 2013/0336568 | A1 * | 12/2013 | Fisher .................. G06V 20/693 |
| | | | 382/133 |
| 2014/0084166 | A1 * | 3/2014 | Cole ...................... G01J 1/4228 |
| | | | 250/342 |
| 2021/0325289 | A1 | 10/2021 | Ilkov et al. |
| 2023/0091403 | A1 * | 3/2023 | Ilkov .......................... G01J 1/10 |

FOREIGN PATENT DOCUMENTS

| | | | |
|---|---|---|---|
| EP | 4139656 | A1 | 3/2023 |
| JP | H11512533 | A | 10/1999 |
| JP | 2002527768 | A | 8/2002 |
| JP | 2003090761 | A | 3/2003 |
| JP | 2005147857 | A | 6/2005 |
| JP | 2008273039 | A | 11/2008 |
| WO | WO0023787 | A1 | 4/2000 |
| WO | WO2017027736 | A1 | 2/2017 |
| WO | WO2021188435 | A1 | 9/2021 |
| WO | WO2021216222 | A1 | 10/2021 |

* cited by examiner

311 — Start acquiring events
- System starts remembering events

312 — Step through voltages and intensities
- System instructs LED to vary intensity for a series of APD gain levels. Encodes each process step through LED pulse frequency 313 — Stop acquiring events
- Software analyzes events and uses frequency domain (time delta between events) to recognize steps

METHOD AND SYSTEMS FOR CHARACTERIZING AND ENCODING A LIGHT DETECTION SYSTEM

CROSS-REFERENCE TO RELATED APPLICATION

Pursuant to 35 U.S.C. § 119 (e), this application claims priority to the filing dates of U.S. Provisional Patent Application Ser. No. 63/107,701 filed Oct. 30, 2020, the disclosure of which application is incorporated herein by reference in their entirety.

INTRODUCTION

The characterization of analytes in biological fluids has become an important part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light an an interrogation point. Variations in the materials in the flow stream, such as morphologies or the presence of fluorescent labels, may cause variations in the observed light detected with a photodetector and these variations allow for characterization and separation.

A flow cytometer instrument uses a variety of optical detectors such as photodiodes (PDs), photo-multiplier tubes (PMTs) and Avalanche Photodiodes (APDs) in order to detect photon emissions from the sample under investigation. The response of these detectors to incident light not only varies with the type of photodetector, but also within multiple specimens of the same type of photodetector. Furthermore, some detectors such as APDs have highly non-linear characteristics.

It is therefore desirable to create detector response curves for a flow cytometer so that the linearity of the response to light for each detector can be measured, and that the response in signal detected due to adjustment in detector gain (for voltage adjustment on photomultiplier tubes, or gain for Avalanche Photo Diodes for example) can be calibrated so that the system can be optimized for sensitivity for different user panels. Conventionally this is done by running fluorescent beads with known scatter profiles (e.g. different sizes) and fluorescent stain intensity and measuring the signal from detectors. Detector gain is also adjusted to explore the response to gain for our known standard particles.

Recently, the introduction of LED technology to produce flashes of a known intensity profile has started to be used to characterize parts of the detection system of the flow cytometer. These pulses generate detection 'events' in the detection system as the pulse exceeds the triggering threshold of the detection system. The height, area and width of the pulse can then be measured, along with a timestamp for the event. In these instances, the LED flasher consists of one or more LEDs (possibly emitting with different optical spectral profiles) that shines into the cytometer's detection system optics. These flashes will make their way through the optical path of fibers, filters and mirrors and are detected at either photodiodes, photomultiplier tubes (PMTs), or avalanche photodiodes (APDs). The intensity of the flash produced by the LED may be controlled, along with the frequency of occurrence, the flash duration, and the overall emission spectrum of the LED flasher.

SUMMARY

Embodiments of the invention provide ways to use control of the time interval of the flashing rate of the LEDs in combination with data stream encoding to increase the reliability and reduce the time of LED based protocols. As described in greater detail below, the subject methods according to certain embodiments can provide for real-time determination and calibration of response linearity of a photodetector to light irradiation and to adjustments to detector gain. Methods described herein provide for more precise and consistent characterization of photodetector response and sensitivity. In some embodiments, the parameters of the photodetector can be determined and calibrated without any further user intervention. In certain embodiments, the parameters of the photodetector can be determined and calibrated in real time without the use of any calibration beads or luminescence control particles.

Aspects of the present disclosure include methods for determining a parameter of a photodetector (e.g., a photodetector in a particle analyzer). Methods according to certain embodiments include detecting light from a light source with a photodetector for a first predetermined time interval, detecting a step signal with the photodetector, the step signal indicating a change in a parameter of the light source or a parameter of the photodetector, detecting light from the light source for a second predetermined time interval, integrating data signals over the first predetermined time interval and the second predetermined time interval and determining one or more parameters of the photodetector based on the integrated data signals. In embodiments, the duration of the first predetermined time interval may be the same or different from the duration of the second predetermined time interval.

In some embodiments, the step signal indicates a change in an intensity of light from the light source. In some instances, the change in intensity is a decrease in the light intensity from the light source. In other instances, the change in intensity is an increase in the light intensity from the light source. In other embodiments, the step signal indicates a change in a spectrum parameter of light from the light source. In some instances, the change in spectrum parameter is a change in the wavelength of light emitted by the light source. In other instances, the change in spectrum parameter is an increase in the number of wavelengths of light emitted by the light source. In certain instances, the increase in the number of wavelengths of light includes an increase in the spectral width emitted by the light source. In other instances, the change in spectrum parameter is a decrease in the number of wavelengths of light emitted by the light source. In certain instances, the decrease in the number of wavelengths of light includes a decrease in the spectral width emitted by the light source.

In some embodiments, the light source is a light emitting diode (LED). In some instances, the light emitting diode is a continuous wave light emitting diode. In other instances, the light emitting diode is a pulsed light emitting diode. In some embodiments, the light source includes one or more monochromatic light emitting diodes. In other embodiments, the light source includes one or more polychromatic light emitting diodes. In other embodiments, the light source includes a plurality of light emitting diodes.

In some instances, the step signal includes a change in the frequency of light pulses from the light source. In certain instances, the step signal includes detecting pulses of light from the light source. In other instances, the step signal includes detecting an increase in the frequency of light pulses as compared to light pulses from the light source detected during the first predetermined time interval. In other instances, the step signal includes detecting a decrease in the frequency of light pulses as compared to light pulses from the light source detected during the first predetermined time interval. In other instances, the step signal includes detecting an increase in the duration of light pulses as compared to light pulses from the light source detected during the first predetermined time interval. In other instances, the step signal includes detecting a decrease in the duration of light pulses as compared to light pulses from the light source detected during the first predetermined time interval. In certain instances, the step signal includes detecting an absence of light from the light source.

In some embodiments, the step signal indicates a change in the detector gain of the photodetector. In some instances, the change in detector gain is a decrease in the detector gain of the photodetector. In other instances, the change in detector gain is an increase in the detector gain of the photodetector. In certain embodiments, a change in the detector gain is indicated by a step signal that includes a change in the frequency of light pulses from the light source. In other embodiments, a change in the detector gain is indicated by a step signal that includes an absence of light from the light source.

In some embodiments, a tag signal is inserted into the data signals of one or more the predetermined time intervals. In some instances, the tag signal is a frequency modulated data signal which may be detected and processed during integration of the data signals from the photodetector over each predetermined time interval. In certain embodiments, the step signal that indicates a change in a parameter of the light source or the photodetector is a tag signal that is inserted in the measured data signals of one or more of the predetermined time intervals.

In certain embodiments, methods include detecting a synchronization signal before detecting light from the light source prior to the first predetermined time interval. In some embodiments, the synchronization signal includes detecting light from the light source having a predetermined pulse frequency. In other embodiments, the synchronization signal includes detecting light from the light source having an intensity that exceeds a predetermined intensity threshold. In other embodiments, the synchronization signal includes detecting light from the light source at a maximum light intensity.

In some embodiments, methods include detecting light from the light source over a plurality of predetermined time intervals. In some instances, the intensity of the light source is increased in intensity after each predetermined time interval (i.e., the second irradiation intensity is greater than the first irradiation intensity). The time interval for detecting light from the light source by the photodetector at each light intensity may vary. In some instances, each time interval is the same. In other instances, each time interval is different.

In embodiments, methods include integrating data signals from the photodetector over a period of time that includes at least the time intervals of irradiation at each different light intensity. In some embodiments, data signals from the photodetector are integrated over a time period that includes a first time interval where the light source irradiates the photodetector at a first intensity and a second time interval where the light source irradiates the photodetector at the second intensity. In other embodiments, data signals from the photodetector are integrated over a period of time that includes a plurality of time intervals where the light source irradiates the photodetector at increasing light intensities during each of the plurality of time intervals.

Integrating data signals from the photodetector in certain embodiments includes calculating a signal amplitude over the period of time. In some instances, calculating the signal amplitude includes calculating the median signal amplitude. In certain instances, methods also include comparing the calculated signal amplitude with the light intensity of the light source. Based on one or more of the calculated signal amplitude and the comparison between the calculated signal amplitude with the light intensity of the light source, a parameter of the photodetector is calculated. For instance, methods may include determining for the photodetector a parameter such as detector sensitivity, minimum detection threshold, maximal detection threshold, detector sensitivity, detector dynamic range, detector signal-to-noise ratio or number of photoelectrons per unit output. The detector parameter may be determined over a range of operating voltages of the photodetector, such as where the parameters of the photodetector are determined over the entire operating voltage range of the photodetector. In certain embodiments, the photodetector is positioned in a particle analyzer, such as where the photodetector is a part of a light detection module of a particle analyzer. In some instances, the particle analyzer is incorporated into a flow cytometer where the photodetector is positioned to detect light from particles in a flow stream.

Aspects of the present disclosure also include systems having a light source and a photodetector that is configured to detect light from the light source for a first predetermined time interval, detect a step signal that indicates a change in a parameter of the light source or a parameter of the photodetector, detect light from the light source for a second predetermined time interval and a processor having memory operably coupled to the processor such that the memory includes instructions stored thereon, which when executed by the processor, cause the processor to integrate data signals from the photodetector over the first predetermined time interval and the second predetermined time interval and determine one or more parameters of the photodetector based on the integrated data signals. In some embodiments, the system is a particle analyzer. In some instances, the photodetector is a part of a light detection module of the particle analyzer. In certain instances, the particle analyzer is incorporated into a flow cytometer.

In some embodiments, the light source is a light emitting diode (LED). In some instances, the light emitting diode is a continuous wave light emitting diode. In other instances, the light emitting diode is a pulsed light emitting diode. In some embodiments, the light source includes one or more monochromatic light emitting diodes. In other embodiments, the light source includes one or more polychromatic light emitting diodes. In other embodiments, the light source includes a plurality of light emitting diodes.

In embodiments, the light detection system includes a photodetector. In some instances, the photodetector is a photomultiplier tube. In other instances, the photodetector is a photodiode. In other instances, the photodetector is an avalanche photodiode. In certain instances, the photodetector includes one or more amplifier components, such as a transimpedance amplifier.

Systems of interest include a processor having memory operably coupled to the processor where the memory includes instructions stored thereon, which when executed by the processor, cause the processor to detect a step signal, that indicates a change in a parameter of the light source or a parameter of the photodetector. In some instances, the step signal includes a change in the frequency of light pulses from the light source. In certain instances, the step signal includes detecting pulses of light from the light source. In other instances, the step signal includes detecting an increase in the frequency of light pulses as compared to light pulses from the light source detected during the first predetermined time interval. In other instances, the step signal includes detecting a decrease in the frequency of light pulses as compared to light pulses from the light source detected during the first predetermined time interval. In other instances, the step signal includes detecting an increase in the duration of light pulses as compared to light pulses from the light source detected during the first predetermined time interval. In other instances, the step signal includes detecting a decrease in the duration of light pulses as compared to light pulses from the light source detected during the first predetermined time interval. In certain instances, the step signal includes detecting an absence of light from the light source.

In some embodiments, the step signal indicates a change in the detector gain of the photodetector. In some instances, the change in detector gain is a decrease in the detector gain of the photodetector. In other instances, the change in detector gain is an increase in the detector gain of the photodetector. In certain embodiments, a change in the detector gain is indicated by a step signal that includes a change in the frequency of light pulses from the light source. In other embodiments, a change in the detector gain is indicated by a step signal that includes an absence of light from the light source.

In some instances, the memory includes instructions for detecting light from the light source over a plurality of predetermined time intervals. In some instances, the intensity of the light source is increased in intensity after each predetermined time interval. The time interval for detecting light from the light source by the photodetector at each light intensity may vary. In some instances, each time interval is the same. In other instances, each time interval is different. In these instances, the memory includes instructions for integrating data signals from the photodetector over a time period that includes the plurality of irradiation time intervals.

In some embodiments, the memory includes instructions for detecting a step signal that indicates a change in an intensity of light from the light source. In some instances, the change in intensity is a decrease in the light intensity from the light source. In other instances, the change in intensity is an increase in the light intensity from the light source. In other embodiments, the memory includes instructions for detecting a step signal that indicates a change in a spectrum parameter of light from the light source. In some instances, the change in spectrum parameter is a change in the wavelength of light emitted by the light source. In other instances, the change in spectrum parameter is an increase in the number of wavelengths of light emitted by the light source. In certain instances, the increase in the number of wavelengths of light includes an increase in the spectral width emitted by the light source. In other instances, the change in spectrum parameter is a decrease in the number of wavelengths of light emitted by the light source. In certain instances, the decrease in the number of wavelengths of light includes a decrease in the spectral width emitted by the light source.

In some embodiments, the memory includes instructions for detecting a tag signal that is inserted into the data signals of one or more the predetermined time intervals. In some instances, the tag signal is a frequency modulated data signal which may be detected and processed during integration of the data signals from the photodetector over each predetermined time interval.

In certain embodiments, the memory includes instructions for detecting a synchronization signal. In some embodiments, the memory includes instructions for detecting a synchronization signal that indicates that light from the light source is detected having a predetermined pulse frequency. In other embodiments, the memory includes instructions for detecting a synchronization signal that indicates that light from the light source is detected having an intensity that exceeds a predetermined intensity threshold. In other embodiments the memory includes instructions for detecting a synchronization signal that indicates that light detected from the light source is at a maximum light intensity.

In some embodiments, the memory includes instructions stored thereon for integrating data signals from the photodetector. In some embodiments, the memory includes instructions for calculating a signal amplitude from the photodetector over each time interval. In other embodiments, the memory includes instructions for calculating a median signal amplitude. In certain embodiments, the memory includes instructions for comparing the calculated signal amplitude with the intensity of irradiation during each predetermined time interval.

In embodiments, systems include memory operably coupled to the processor where the memory includes instructions stored thereon, which when executed by the processor, cause the processor to determine a parameter of the photodetector based on one or more of the calculated signal amplitude and the comparison between the calculated signal amplitude with the light intensity of the light source. For instance, the memory may include instructions for determining detector sensitivity, minimum detection threshold, maximal detection threshold, detector sensitivity, detector dynamic range, detector signal-to-noise ratio or number of photoelectrons per unit output. The subject systems may be configured to determine the detector parameter over a range of operating voltages of the photodetector, such as over the entire operating voltage range of the photodetector.

Aspects of the present disclosure also include non-transitory computer readable storage medium for determining one or more parameters of a photodetector. In embodiments, the non-transitory computer readable storage medium includes algorithm for detecting light from a light source with a photodetector in a particle analyzer for a first predetermined time interval, algorithm for detecting a step signal that indicates a change in a parameter of the light source or a parameter of the photodetector, algorithm for detecting light from the light source with the photodetector for a second predetermined time interval, algorithm for integrating data signals from the photodetector over the first predetermined time interval and the second predetermined time interval and algorithm for determining one or more parameters of the photodetector based on the integrated data signals.

In certain instances, the non-transitory computer readable storage medium includes algorithm for detecting light from the light source over a plurality of predetermined time intervals. In some instances, the intensity of the light source is increased in intensity after each predetermined time interval. The time interval for detecting light from the light source by the photodetector at each light intensity may vary. In some instances, each time interval is the same. In other instances, each time interval is different. In these instances, the non-transitory computer readable storage medium includes algorithm for integrating data signals from the photodetector over a time period that includes the plurality of irradiation time intervals.

In some embodiments, the non-transitory computer readable storage medium includes algorithm for detecting a step signal that indicates a change in an intensity of light from the light source. In some instances, the change in intensity is a decrease in the light intensity from the light source. In other instances, the change in intensity is an increase in the light intensity from the light source. In other embodiments, the non-transitory computer readable storage medium includes algorithm for detecting a step signal that indicates a change in a spectrum parameter of light from the light source. In some instances, the change in spectrum parameter is a change in the wavelength of light emitted by the light source. In other instances, the change in spectrum parameter is an increase in the number of wavelengths of light emitted by the light source. In certain instances, the increase in the number of wavelengths of light includes an increase in the spectral width emitted by the light source. In other instances, the change in spectrum parameter is a decrease in the number of wavelengths of light emitted by the light source. In certain instances, the decrease in the number of wavelengths of light includes a decrease in the spectral width emitted by the light source.

In some instances, the non-transitory computer readable storage medium includes algorithm for detecting a step signal that includes a change in the frequency of light pulses from the light source. In certain instances, the non-transitory computer readable storage medium includes algorithm for detecting a step signal that includes detecting pulses of light from the light source. In other instances, the non-transitory computer readable storage medium includes algorithm for detecting a step signal that includes detecting an increase in the frequency of light pulses as compared to light pulses from the light source detected during the first predetermined time interval. In other instances, the non-transitory computer readable storage medium includes algorithm for detecting a step signal that includes detecting a decrease in the frequency of light pulses as compared to light pulses from the light source detected during the first predetermined time interval. In other instances, the non-transitory computer readable storage medium includes algorithm for detecting a step signal that includes detecting an increase in the duration of light pulses as compared to light pulses from the light source detected during the first predetermined time interval. In other instances, the non-transitory computer readable storage medium includes algorithm for detecting a step signal that includes detecting a decrease in the duration of light pulses as compared to light pulses from the light source detected during the first predetermined time interval. In certain instances, the non-transitory computer readable storage medium includes algorithm for detecting a step signal that includes detecting an absence of light from the light source.

In some embodiments, the non-transitory computer readable storage medium includes algorithm for detecting a step signal that indicates a change in the detector gain of the photodetector. In some instances, the change in detector gain is a decrease in the detector gain of the photodetector. In other instances, the change in detector gain is an increase in the detector gain of the photodetector. In certain embodiments, a change in the detector gain is indicated by a step signal that includes a change in the frequency of light pulses from the light source. In other embodiments, a change in the detector gain is indicated by a step signal that includes an absence of light from the light source.

In some embodiments, the non-transitory computer readable storage medium includes algorithm for detecting a tag signal that is inserted into the data signals of one or more the predetermined time intervals. In some instances, the tag signal is a frequency modulated data signal which may be detected and processed during integration of the data signals from the photodetector over each predetermined time interval.

In certain embodiments, the non-transitory computer readable storage medium includes algorithm for detecting a synchronization signal before detecting light from the light source before the first predetermined time interval. In some embodiments, the synchronization signal includes detecting light from the light source having a predetermined pulse frequency. In other embodiments, the synchronization signal includes detecting light from the light source having an intensity that exceeds a predetermined intensity threshold. In other embodiments, the synchronization signal includes detecting light from the light source at a maximum light intensity.

In some embodiments, the non-transitory computer readable storage medium includes algorithm for calculating a signal amplitude. In some instances, the non-transitory computer readable storage medium includes algorithm for calculating the median signal amplitude. In certain instances, the non-transitory computer readable storage medium includes algorithm for comparing the calculated signal amplitude with the light intensity of the light source. In certain instance, the non-transitory computer readable storage medium includes algorithm for determining a parameter of the photodetector based on one or more of the calculated signal amplitude and the comparison between the calculated signal amplitude with the light intensity of the light source. For example, the non-transitory computer readable storage medium may include algorithm for determining detector sensitivity, minimum detection threshold, maximal detection threshold, detector sensitivity, detector dynamic range, detector signal-to-noise ratio or number of photoelectrons per unit output. The non-transitory computer readable storage medium may include algorithm for determining the detector parameter over a range of operating voltages of the photodetector, such as where the parameters of the photodetector are determined over the entire operating voltage range of the photodetector.

BRIEF DESCRIPTION OF THE FIGURES

The invention may be best understood from the following detailed description when read in conjunction with the accompanying drawings. Included in the drawings are the following figures:

FIG. 2A depicts detecting a step signal where the pulse frequency of light detected by the photodetector is changed. FIG. 2B depicts a step signal where no light signal is detected.

DETAILED DESCRIPTION

Figure 1A:
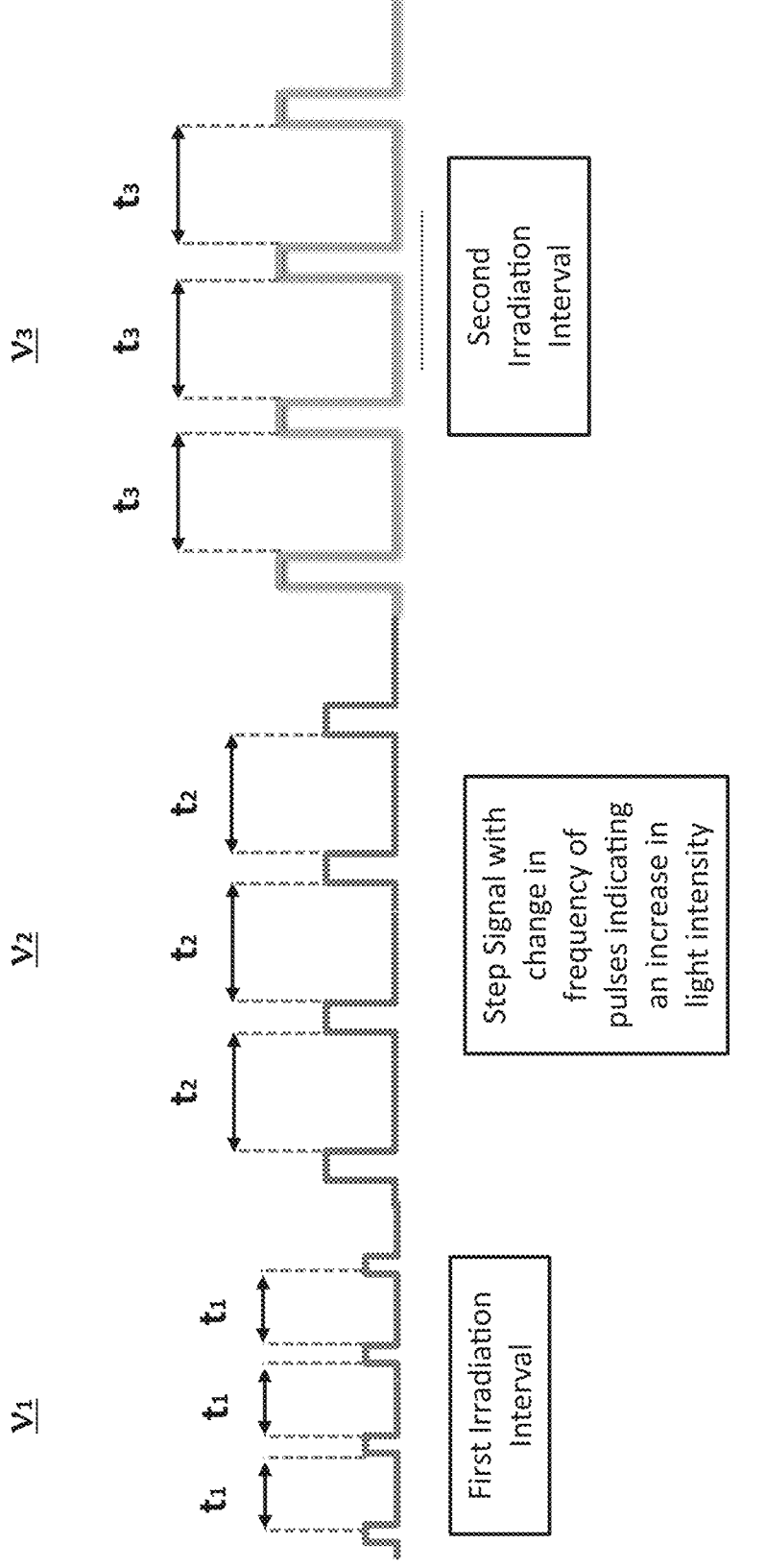
FIG. 1A depicts detecting a step signal that includes a change in the frequency of pulses to indicate a change in light intensity from a light source according to certain embodiments.

Aspects of the present disclosure include methods for determining a parameter of a photodetector (e.g., a photodetector in a particle analyzer). Methods according to certain embodiments include detecting light from a light source with a photodetector for a first predetermined time interval, detecting a step signal with the photodetector, the step signal indicating a change in a parameter of the light source or a parameter of the photodetector, detecting light from the light source for a second predetermined time interval, integrating data signals over the first predetermined time interval and the second predetermined time interval and determining one or more parameters of the photodetector based on the integrated data signals. Systems (e.g., particle analyzers) having a light source and a photodetector for practicing the subject methods are also described. Non-transitory computer readable storage medium having instructions stored thereon for determining a parameter of a photodetector according to the subject methods is also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods and systems for determining one or more parameters of a photodetector (e.g., a photodetector of a particle analyzer). In further describing embodiments of the disclosure, methods including detecting light from a light source with a photodetector for a first predetermined time interval, detecting a step signal that indicates a change in a parameter of the light source or a parameter of the photodetector, detecting light for a second predetermined time interval and integrating data signals from the photodetector over a time period are first described in greater detail. Next, systems (e.g., particle analyzers) having a light source and a photodetector for practicing the subject methods are described. Non-transitory computer readable storage medium having instructions stored thereon for determining a parameter of a photodetector according to the subject methods is also provided.

Methods for Determining a Parameter of a Photodetector

Aspects of the present disclosure include methods for determining parameters of a photodetector (e.g., a photodetector in a particle analyzer). In practicing the subject methods, a photodetector is irradiated with a light source and light is detected for a first predetermined time interval, a step signal is detected by the photodetector and light is detected from the light source for a second predetermined time interval. As described in greater detail below, the subject methods according to certain embodiments can provide for real-time determination and calibration of response linearity of a photodetector to light irradiation and to adjustments to detector gain. Methods described herein provide for more precise and consistent characterization of photodetector response and sensitivity. In some embodiments, the parameters of the photodetector can be determined and calibrated without any further user intervention. In certain embodiments, the parameters of the photodetector can be determined and calibrated in real time without the use of any calibration beads or luminescence control particles.

In some embodiments, the photodetector is irradiated for one or more predetermined time intervals with a pulsed light source. The term "pulsed light source" is used herein in its conventional sense to refer to a source of light which emits light at predetermined time intervals, each time interval having a predetermined irradiation duration (i.e., pulse width). In certain embodiments, the pulsed light source is configured to irradiate the photodetector with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In certain embodiments, the photodetector is irradiated for one or more predetermined time intervals with a continuous wave light source. The term "continuous wave light source" is used herein in its conventional sense to refer to a source of light which provides uninterrupted light flux and maintains irradiation of the photodetector with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In embodiments, the light source may be any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, the light source is a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

In some embodiments, the light source emits light having wavelengths that overlap, such as where the output spectrum of one or more components of the lights source overlap by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more. In some embodiments, the wavelengths of light emitted by the light sources exhibit no overlap. For example, the output spectrum of the light sources may be separated by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more.

The photodetector may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the photodetector may be at any suitable angle such as at an angle ranging from 10° to 90°, such as from 15° to 85°, such as from 20° to 80°, such as from 25° to 75° and including from 30° to 60°, for example at a 90° angle.

In practicing the subject methods, the photodetector is irradiated with the light source for two or more discrete time intervals. The term "discrete time interval" is used herein in its conventional sense to refer to irradiating the photodetector with the light source for a predetermined duration of time followed by a period of time where a parameter of the light source or detector is changed and followed by a subsequent discrete time interval of irradiation. In some embodiments, methods include irradiating the photodetector in discrete time intervals that are independently 0.1 ms or more, such as for 0.5 ms or more, such as for 1.0 ms or more, such as for 5 ms or more, such as for 10 ms or more, such as for 20 ms or more, such as for 30 ms or more, such as for 40 ms or more, such as for 50 ms or more, such as for 60 ms or more, such as for 70 ms or more, such as for 80 ms or more, such as for 90 ms or more and including for 100 ms or more. In certain embodiments, each predetermined time interval for irradiating the photodetector is the same duration. For instance, each predetermined time interval according to the subject methods may be 50 ms. In other embodiments, each predetermined time interval is different. In certain embodiments, methods include irradiating the photodetector with the light source over a plurality of discrete time intervals, such as 3 or more discrete time intervals, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 75 or more and including 100 or more discrete time intervals. In some embodiments, each of the plurality of time intervals is the same duration. In other embodiments, each of the plurality of time intervals is a different duration. In still other embodiments, some of the time intervals may be the same duration and some of the time intervals may be a different duration.

In some embodiments, the intensity of irradiation by the light source is substantially constant for the duration of each predetermined time interval, such as where the intensity of irradiation varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the intensity of irradiation by the light source varies by 0.000001% or less for the duration of the predetermined time interval.

In practicing the subject methods, a parameter of the light source or the photodetector may be changed after each discrete irradiation interval. In embodiments, methods include detecting a step signal with the photodetector where detecting the step signal indicates that a parameter of the light source or a parameter of the photodetector has been changed. In some instances, the step signal includes a change in the frequency of light irradiation by the light source. In some embodiments, the light source is a continuous wave light source and the step signal includes irradiating the light source with one or more pulses of light. For example, where the photodetector is irradiated with a continuous light source for the predetermined time interval, the step signal may include irradiating the light source with 2 pulses of light or more to indicate a change in a parameter of the light source or parameter of the photodetector during the next predetermined time interval, such as 3 pulses or more, such as 4 pulses or more, such as 5 pulses or more, such as 6 pulses or more, such as 7 pulses or more, such as 8 pulses or more, such as 9 pulses or more and including 10 pulses or more.

In other embodiments, the photodetector is irradiated with a pulsed light source during a predetermined time interval and the step signal includes a change in the frequency of light pulses by the light source. In some instances, the frequency of light pulses is increased, such as where the frequency is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including increasing the frequency of light pulses by 5-fold or more. For example, the frequency of the light pulses may be increased by 0.0001 kHz or more, such as by 0.0005 kHz or more, such as by 0.001 kHz or more, such as by 0.005 kHz or more, such as by 0.01 kHz or more, such as by 0.05 kHz or more, such as by 0.1 kHz or more, such as by 0.5 kHz or more, such as by 1 kHz or more, such as by 2.5 kHz or more, such as by 5 kHz or more, such as by 10 kHz or more, such as by 25 kHz or more, such as by 50 kHz or more and including increasing the frequency of the light pulses by 100 kHz or more. In other instances, the step signal includes a decrease in the frequency of light pulses by the light source, such as where the frequency is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including decreasing the frequency of light pulses by 5-fold or more. For example, the frequency of the light pulses may be decreased by 0.0001 kHz or more, such as by 0.0005 kHz or more, such as by 0.001 kHz or more, such as by 0.005 kHz or more, such as by 0.01 kHz or more, such as by 0.05 kHz or more, such as by 0.1 kHz or more, such as by 0.5 kHz or more, such as by 1 kHz or more, such as by 2.5 kHz or more, such as by 5 kHz or more, such as by 10 kHz or more, such as by 25 kHz or more, such as by 50 kHz or more and including decreasing the frequency of the light pulses by 100 kHz or more.

In some embodiments, the step signal includes a change in the duration of light pulses by the light source. In some instances, the duration of light pulses is increased, such as where the duration is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including increasing the duration of light pulses by 5-fold or more. For example, the duration of the light pulses may be increased by 0.0001 ms or more, such as by 0.0005 ms or more, such as by 0.001 ms or more, such as by 0.005 ms or more, such as by 0.01 ms or more, such as by 0.05 ms or more, such as by 0.1 ms or more, such as by 0.5 ms or more, such as by 1 ms or more, such as by 2.5 ms or more, such as by 5 ms or more, such as by 10 ms or more, such as by 25 ms or more, such as by 50 ms or more and including increasing the frequency of the light pulses by 100 ms or more. In other instances, the step signal includes a decrease in the duration of light pulses by the light source, such as where the duration is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including decreasing the duration of light pulses by 5-fold or more. For example, the duration of the light pulses may be decreased by 0.0001 ms or more, such as by 0.0005 ms or more, such as by 0.001 ms or more, such as by 0.005 ms or more, such as by 0.01 ms or more, such as by 0.05 ms or more, such as by 0.1 ms or more, such as by 0.5 ms or more, such as by 1 ms or more, such as by 2.5 ms or more, such as by 5 ms or more, such as by 10 ms or more, such as by 25 ms or more, such as by 50 ms or more and including decreasing the frequency of the light pulses by 100 ms or more.

FIG. 1A depicts detecting a step signal that includes a change in the frequency of pulses to indicate a change in light intensity from a light source according to certain embodiments. The photodetector is irradiated for a first irradiation interval with light having a pulse frequency of $v_1$ (time between irradiation pulses, $t_1$). A step signal is detected having a different pulse frequency $v_2$ (time between irradiation pulses, $t_2$). In this embodiment, the step signal indicates that the intensity of the light source is increased and light having a pulse frequency of $v_3$ (time between irradiation pulses, $t_3$) is detected by the photodetector during the second irradiation interval.

Figure 1B:
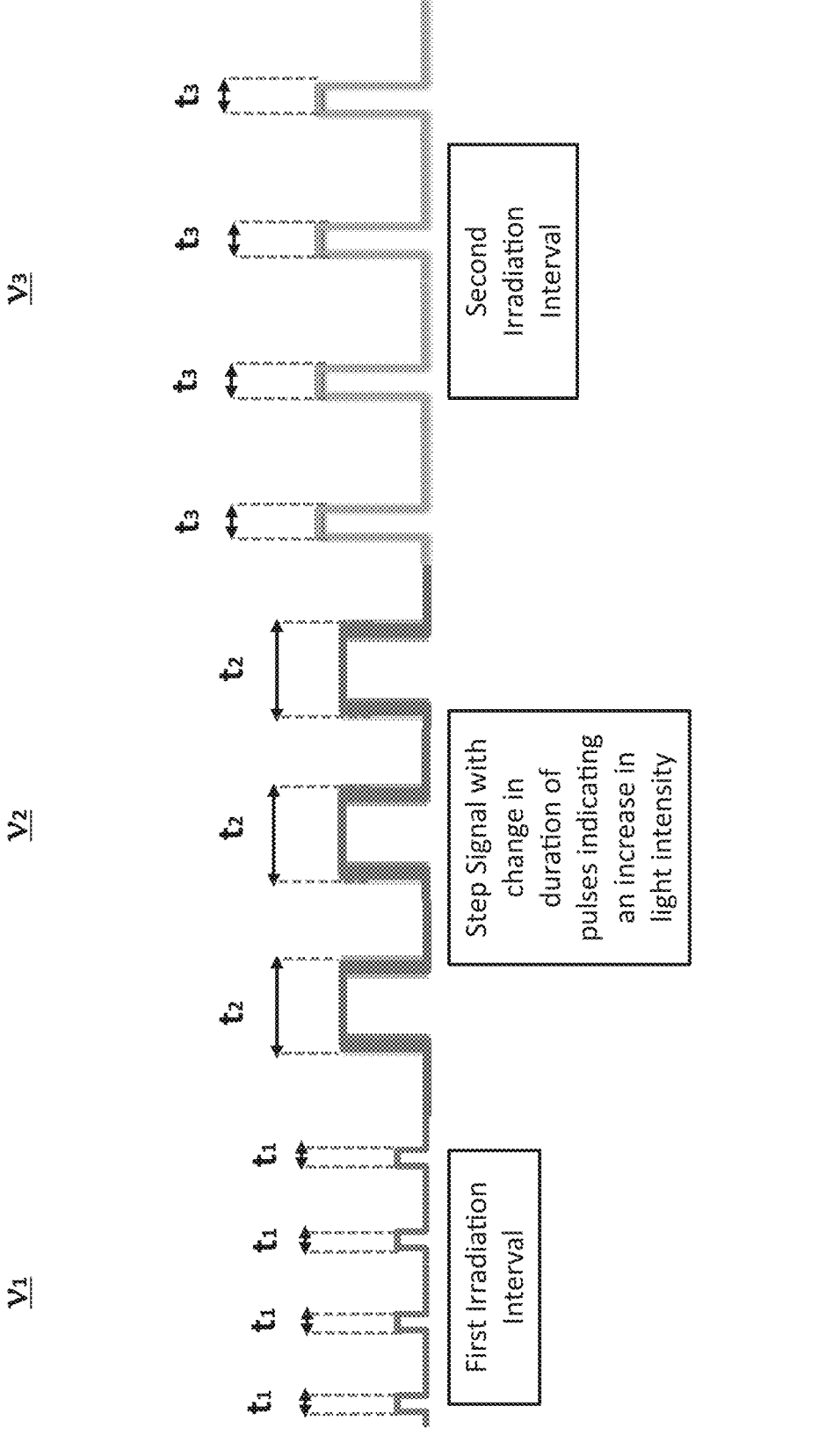
FIG. 1B depicts detecting a step signal that includes a change in the duration of pulses to indicate a change in light intensity from a light source according to certain embodiments.

FIG. 1B depicts detecting a step signal that includes a change in the duration of pulses to indicate a change in light intensity from a light source according to certain embodiments. The photodetector is irradiated for a first irradiation interval with light having a pulse duration $t_1$. A step signal is detected having a different pulse duration $t_2$. In this embodiment, the step signal indicates that the intensity of the light source is increased and light having a pulse duration of $t_3$ is detected by the photodetector during the second irradiation interval.

Figure 1C:
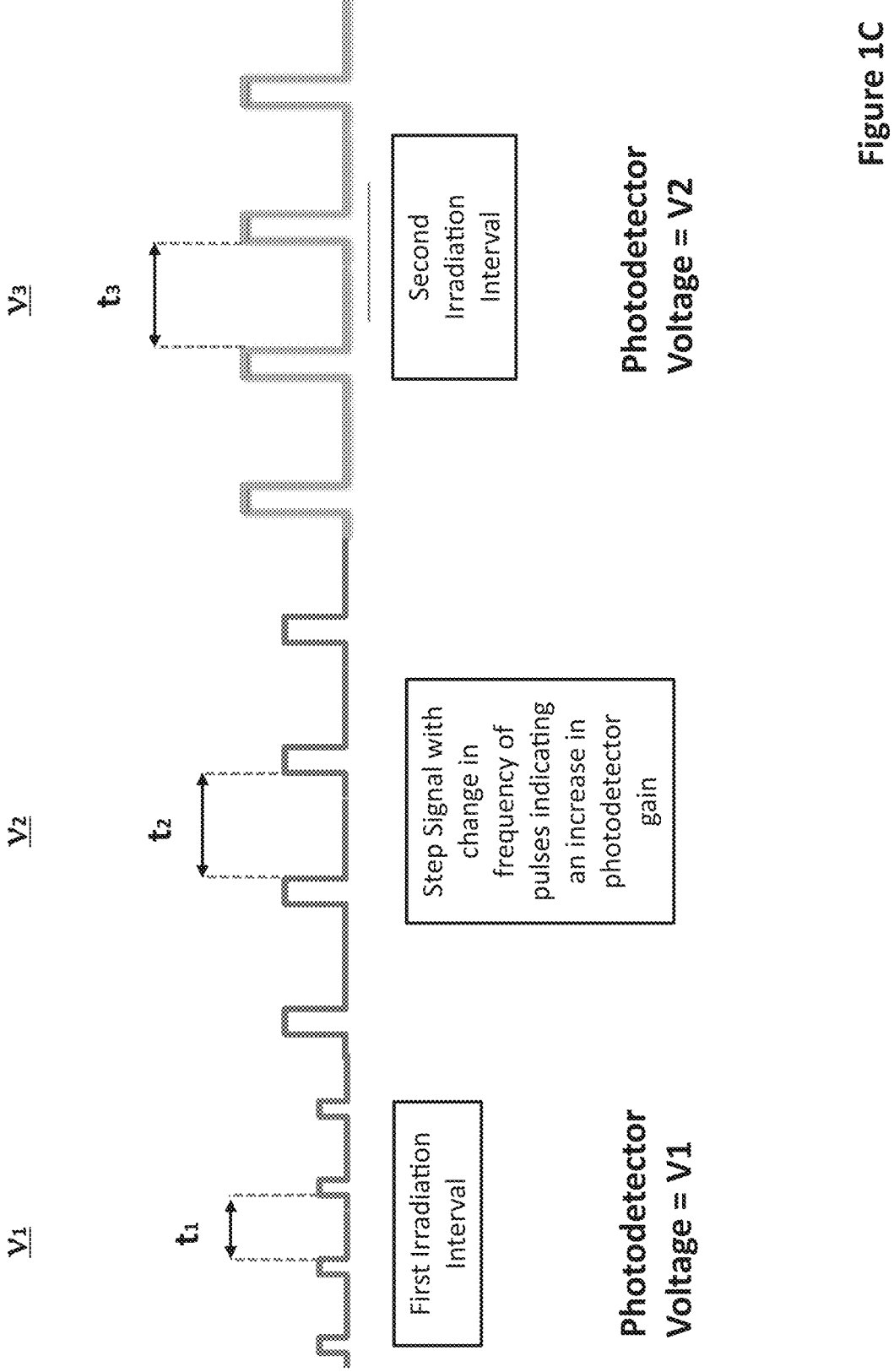
FIG. 1C depicts detecting a step signal that includes a change in the frequency of pulses to indicate a change in detector gain of a photodetector according to certain embodiments.

FIG. 1C depicts detecting a step signal that includes a change in the frequency of pulses to indicate a change in detector gain of a photodetector according to certain embodiments. Light having a pulse frequency $v_1$ (time between irradiation pulses, $t_1$) is used to irradiate a photodetector set at first detector gain voltage V1. A step signal having a different pulse frequency $v_2$ (time between irradiation pulses, $t_2$) is detected indicating that the photodetector gain has been changed to a voltage V2. The photodetector set at detector gain V2 is irradiated with a light source having a pulse frequency $v_3$ (time between irradiation pulses, $t_3$).

Figure 1D:
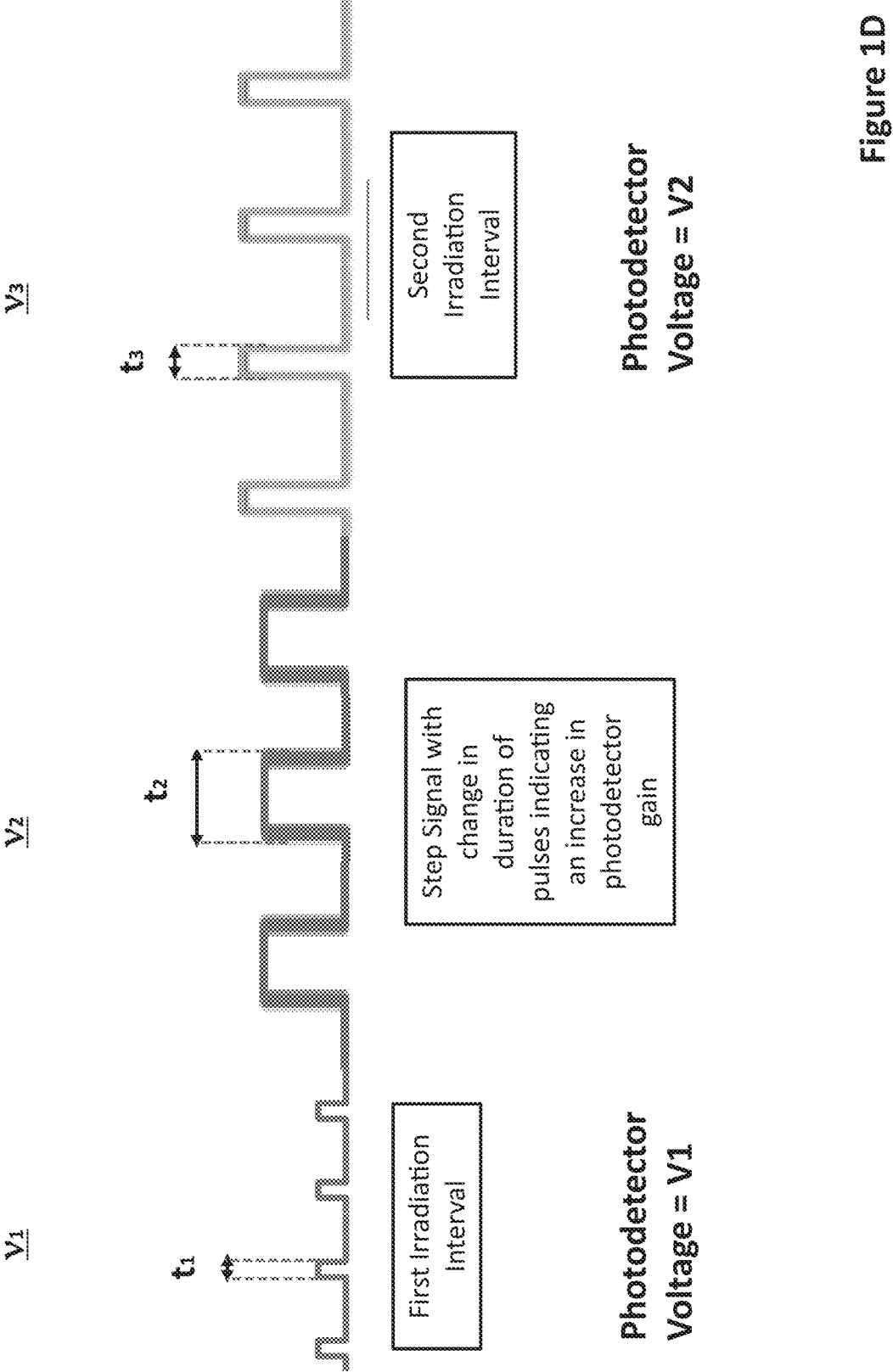
FIG. 1D depicts detecting a step signal that includes a change in the duration of pulses to indicate a change in detector gain of a photodetector according to certain embodiments.

FIG. 1D depicts detecting a step signal that includes a change in the duration of pulses to indicate a change in detector gain of a photodetector according to certain embodiments. Light having a pulse duration $t_1$ is used to irradiate a photodetector set at first detector gain voltage V1. A step signal having a different pulse duration, $t_2$ is detected indicating that the photodetector gain has been changed to a voltage V2. The photodetector set at detector gain V2 is irradiated with a light source having a pulse duration $t_3$.

In certain embodiments, the step signal includes detecting an absence of light from the lights source. By "absence of light" is meant that the amount of light detected by the photodetector is indistinguishable from background noise generated by one or more components of the subject systems (described in detail below), such as electronic noise from the photodetector or light source. In some instances, no light is emitted by the light source and no amount of light is detected by the photodetector. In other instances, an amount of light that is below the photodetector detection threshold is emitted by light source and the light signal is indistinguishable from background noise.

Figures 2A, 2B:
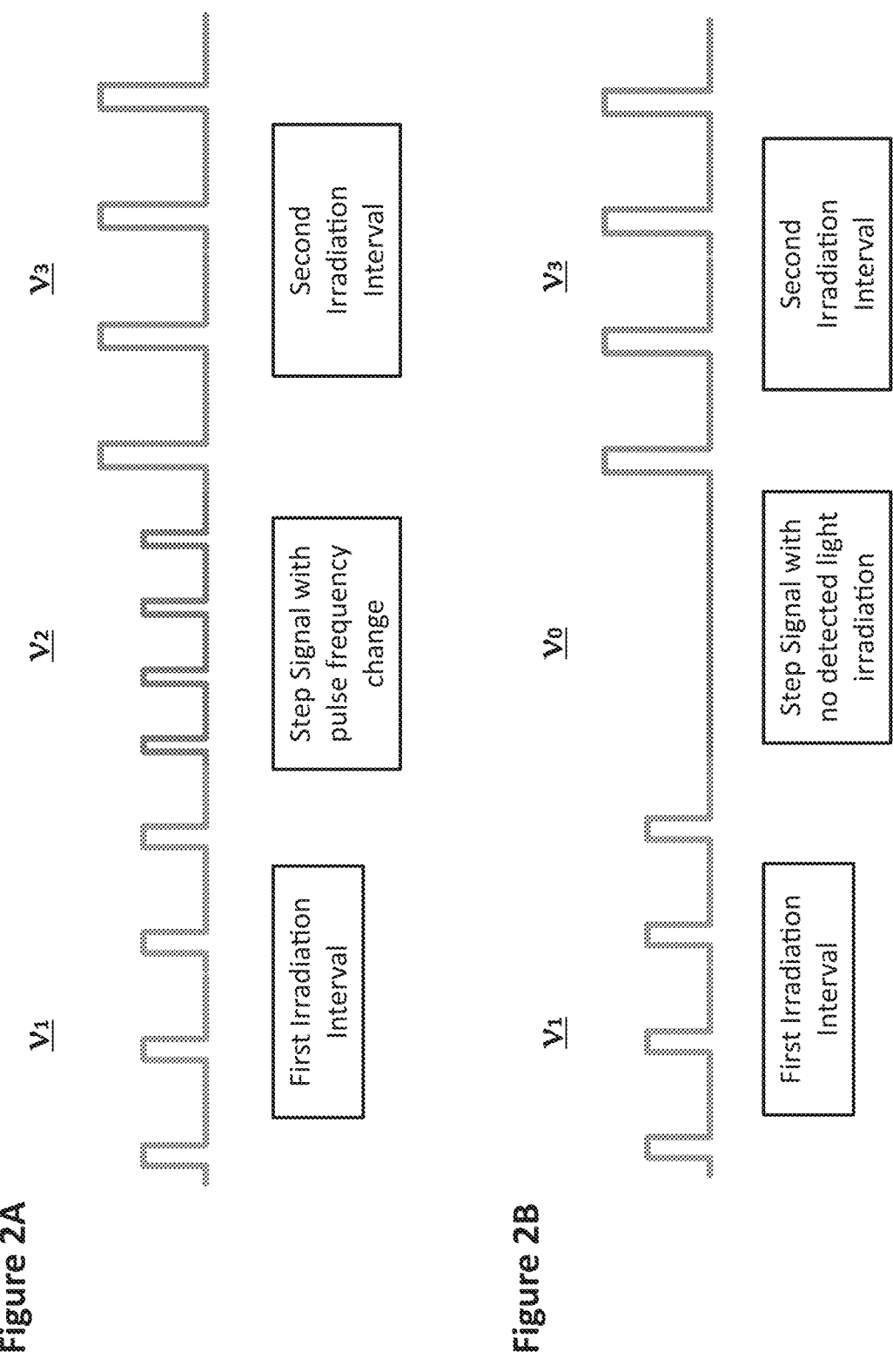
FIGS. 2A and 2B depict detecting a step signal to indicate a change in a parameter of a light source or in a parameter of a photodetector according to certain embodiments.

FIGS. 2A and 2B depict detecting a step signal to indicate a change in a parameter of a light source or in a parameter of a photodetector according to certain embodiments. FIG. 2A depicts a step signal where the pulse frequency of light detected by the photodetector is changed to indicate a change in the parameter of the light source (e.g., increase in light intensity) or a change in the parameter of the photo-detector (e.g., increase in detector gain voltage). FIG. 2B depicts a step signal where no light signal is detected to indicate the change in the parameter of the light source or photodetector.

The duration of the step signal may vary such as where each step signal in the subject methods may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of the step signal may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In some embodiments, the step signal indicates a change in an intensity of light from the light source. In some instances, the change in intensity is a decrease in the light intensity from the light source. For example, the step signal may indicate a decrease in intensity of the light source, such as where the intensity of light emitted by the light source is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates a decrease in the intensity of light from the light source by 5-fold or more. In other instances, the change in intensity is an increase in the light intensity from the light source. For example, the step signal may indicate an increase in intensity of the light source, such as where the intensity of light emitted by the light source is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates an increase in the intensity of light from the light source by 5-fold or more.

In other embodiments, the step signal indicates a change in a spectrum parameter of light from the light source. In some instances, the change in spectrum parameter is a change in the wavelength of light emitted by the light source. In one example, the light source is a monochromatic light source and the step signal indicates a change from a first wavelength of light from the light source to a second wavelength of light. In another example, the light source includes plurality of monochromatic light sources and the step signal indicates a change in one more of the wave-lengths of light of the plurality of monochromatic light sources, such as where the wavelength of light is changed for 5% or more of the plurality of light sources, such as 10% or more, such as 20% or more, such as 30% or more, such as 40% or more, such as 50% or more, such as 60% or more, such as 70% or more, such as 80% or more, such as 90% or more and including where all of the wavelengths of light from the plurality of light sources are changed.

In other instances, the change in spectrum parameter is a change in the number of wavelengths of light emitted by the light source. For example, the change in spectrum parameter may include an increase in the number of wavelengths emitted by the light source. In certain instances, the number of wavelengths emitted by the light source may be increased by 5% or more, such as by 10% or more, such as by 20% or more, such as by 30% or more, such as by 40% or more, such as by 50% or more, such as by 60% or more, such as by 70% or more, such as by 80% or more, such as by 90% or more, such as by 1.5 fold or more, such as by 2-fold or more, such as by 3-fold or more, such as by 4-fold or more, such as by 5-fold or more and including by 10-fold or more. In other embodiments, the change in spectrum parameter includes a decrease in the number of wavelengths emitted by the light source. In certain instances, the number of wave-lengths emitted by the light source may be decreased by 5% or more, such as by 10% or more, such as by 20% or more, such as by 30% or more, such as by 40% or more, such as by 50% or more, such as by 60% or more, such as by 70% or more, such as by 80% or more, such as by 90% or more, such as by 1.5 fold or more, such as by 2-fold or more, such as by 3-fold or more, such as by 4-fold or more, such as by 5-fold or more and including by 10-fold or more.

In some embodiments, the change in the number of wavelengths of light emitted by the light source includes a change in the spectral width emitted by the light source. In some instances, the spectral width emitted by the light source may be increased by 5 nm or more, such as by 10 nm or more, such as by 25 nm or more, such as by 50 nm or more, such as by 100 nm or more, such as by 250 nm or more and including by 500 nm or more. In other instances, the spectral width emitted by the light source may be decreased by 5 nm or more, such as by 10 nm or more, such as by 25 nm or more, such as by 50 nm or more, such as by 100 nm or more, such as by 250 nm or more and including by 500 nm or more.

In these embodiments, the number of wavelengths (e.g., spectral width) emitted by the light source may be changed by any convenient protocol. In some embodiments, the number of wavelengths emitted by the light source is changed by changing the number of monochromatic light emitters (e.g., single wavelength LEDs or lasers) in the light source. For example, one or more monochromatic light emitters (e.g., LEDs) of the light source may be turned on or off to change the number of wavelengths of light emitted by the light source. In other embodiments, the number of wavelengths detected by the photodetector may be changed, such as by using a bandpass filter, cutoff filter or dichroic mirror. In yet other embodiments, the number of wavelengths detected by the photodetector may be changed with a monochromator, prism or diffraction grating.

In some embodiments, the step signal indicates a change in a parameter of the photodetector. In certain embodiments, the parameter is a change in the detector gain of the photodetector. In some instances, the change in detector gain is a decrease in the detector gain of the photodetector. For example, the example, the step signal may indicate a decrease in the detector gain of the photodetector, such as where the detector gain of the photodetector is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates a decrease in the intensity of light from the light source by 5-fold or more. In certain instances, the step signal indicates a decrease in the detector gain by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 5 mV or more, such as by 10 mV or more, such as by 25 mV or more, such as by 50 mV or more, such as by 100 mV or more, such as by 250 mV or more, such as by 500 mV or more, such as by 1000 mV or more, such as by 2500 mV or more and including by 5000 mV or more. In certain embodiments, the step signal indicates a decrease in the detector gain by 1 V or more, such as by 2 V or more, such as by 5 V or more, such as by 10 V or more, such as by 25 V or more, such as by 50 V or more, such as by 100 V or more, such as by 200 V or more, such as by 300 V or more, such as by 400 V or more, such as by 500 V or more and including by 600 V or more.

In other embodiments, the step signal indicates an increase in the detector gain of the photodetector, such as where the detector gain of the photodetector is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates an increase in the intensity of light from the light source by 5-fold or more. In certain instances, the step signal indicates an increase in the detector gain by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 5 mV or more, such as by 10 mV or more, such as by 25 mV or more, such as by 50 mV or more, such as by 100 mV or more, such as by 250 mV or more, such as by 500 mV or more, such as by 1000 mV or more, such as by 2500 mV or more and including by 5000 mV or more. In certain embodiments, the step signal indicates an increase in the detector gain by 1 V or more, such as by 2 V or more, such as by 5 V or more, such as by 10 V or more, such as by 25 V or more, such as by 50 V or more, such as by 100 V or more, such as by 200 V or more, such as by 300 V or more, such as by 400 V or more, such as by 500 V or more and including by 600 V or more.

In practicing the subject methods according to some embodiments, the intensity of the light source is changed after each discrete irradiation interval. In some embodiments, the intensity of irradiation by the light source is increased. In other embodiments, the intensity of the light source is decreased. The intensity of light used to irradiate the photodetector may be changed by 5% or more for each subsequent time interval, such as by 10% or more, such as by 25% or more, such as by 50% or more, such as by 75% or more, such as by 90% or more and including by 100% or more. In certain instances, the intensity of light is changed by 1.5-fold or more, such as by 2-fold or more, such as by 3-fold or more, such as by 4-fold or more and including by 5-fold or more. In some embodiments, methods include increasing the light intensity for each subsequent time interval, such as by increasing the light intensity by 5% or more for each subsequent time interval, such as by 10% or more, such as by 25% or more, such as by 50% or more, such as by 75% or more, such as by 90% or more and including by 100% or more. In other embodiments, methods include increasing the light intensity for each subsequent time interval by 1.5-fold or more, such as by 2-fold or more, such as by 3-fold or more, such as by 4-fold or more and including by 5-fold or more.

In some embodiments where the subject methods include a plurality of discrete irradiation intervals, each discrete interval may be separated by a step signal as described above. In other words, a step signal is detected before another discrete irradiation interval commences. In some embodiments, the step signal indicates a change in a parameter of the light source (e.g., wavelength range or intensity) or a parameter of the photodetector (e.g., detector gain) between each discrete irradiation interval. In other embodiments, the step signal indicates that there is no change in a parameter of the light source or parameter of the photodetector. In some embodiments, methods include detecting a step signal after every 2 or more discrete irradiation intervals, such as after every 3 or more discrete irradiation intervals, such as after every 4 or more discrete irradiation intervals, such as every 5 or more discrete irradiation intervals and including after every 10 or more discrete irradiation intervals. In certain embodiments, the plurality of discrete irradiation intervals is separated by step signals at random (i.e., no regular pattern discrete irradiation intervals between step signals).

In some embodiments, a tag signal is inserted into the data signals of one or more the predetermined time intervals. In some instances, the tag signal is a frequency modulated data signal which may be detected and processed during integration of the data signals from the photodetector over each predetermined time interval. The tag signal may be inserted at any time point during the one or more predetermined time intervals, such as where the tag signal is inserted at the beginning of data signal acquisition of each predetermined time interval. In other embodiments, the tag signal is inserted at the end of the data signal acquisition of each predetermined time interval. In other embodiments, the tag signal is inserted at a time point that is 10% or more into the predetermined time interval, such as at a time point that is 25% or more, such as at a time point that is 50% or more, such as at a time point that is 50% or more and including at a time point that is 75% or more into the predetermined time interval. In embodiments, the tag signal may be a unique identifier of the predetermined time interval. For example, the tag signal may indicate a particular detector gain or light source intensity step that is being used in determining one or more parameters of the photodetector. In certain embodiments, the step signal (described above) that indicates a change in a parameter of the light source or the photodetector is a tag signal that is inserted in the measured data signals of one or more of the predetermined time intervals.

In certain embodiments, methods include detecting a synchronization signal before detecting light from the light source before the first discrete irradiation time interval. In some embodiments, the synchronization signal includes detecting light from the light source having a predetermined pulse frequency. In other embodiments, the synchronization signal includes detecting light from the light source having an intensity that exceeds a predetermined intensity threshold. In other embodiments, the synchronization signal includes detecting light from the light source at a maximum light intensity.

As described above, methods of the present disclosure include detecting light with the photodetector. Photodetectors for practicing the subject methods may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

In embodiments of the present disclosure, light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths.

In embodiments, light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

Figure 3A:
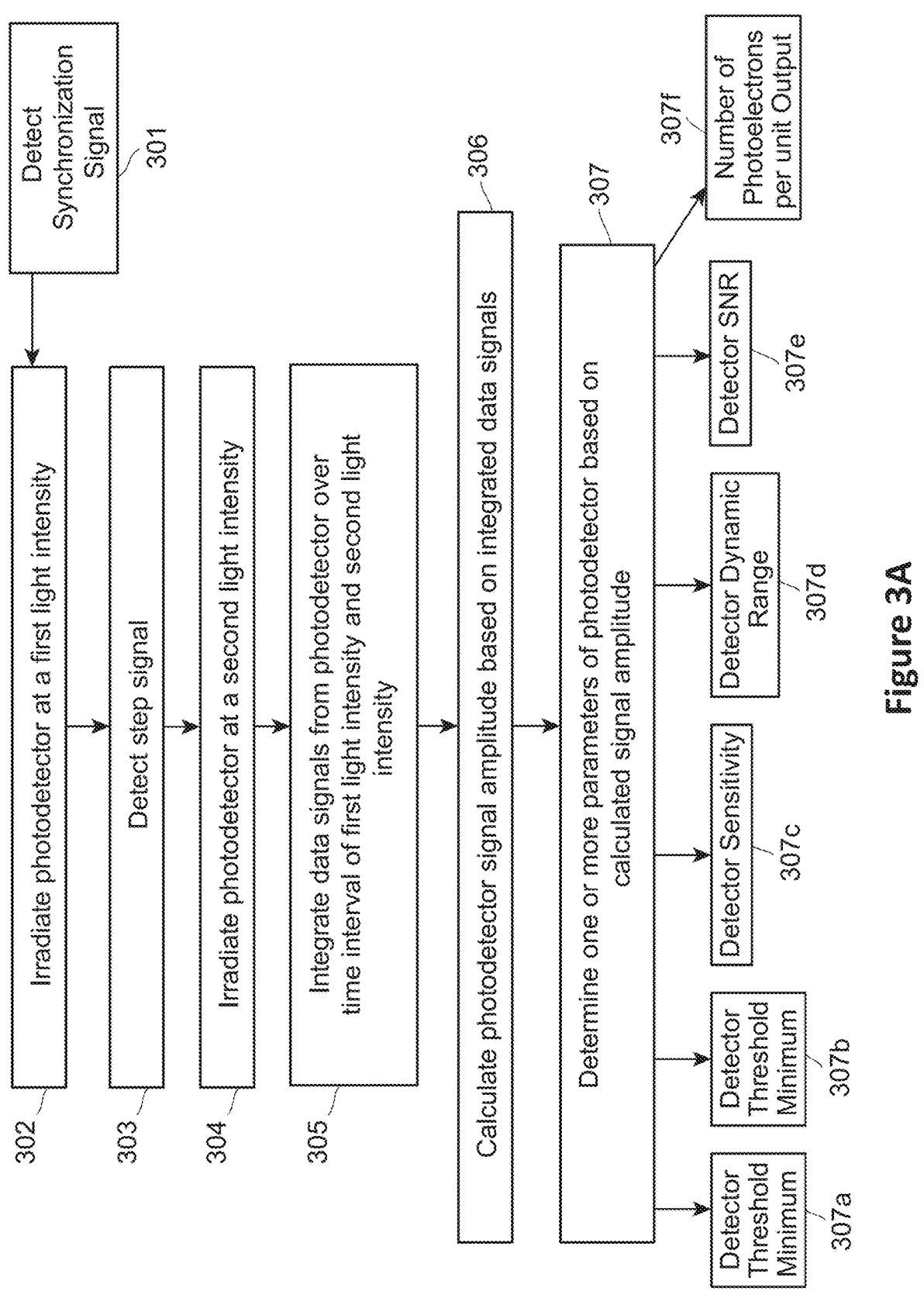
FIGS. 3A to 3C depicts a flow chart for determining one or more parameters of a photodetector according to certain embodiments.

FIG. 3A depicts a flow chart for determining one or more parameters of a photodetector according to certain embodiments. At step 301, a synchronization signal is detected by the photodetector. In some embodiments, the synchronization signal detected by photodetector includes detecting light from the light source at an intensity that exceeds a predetermined threshold. In certain instances, the synchronization signal detected is light from the light source operating at its maximum intensity. At step 302, a photodetector is irradiated with a light source at a first light intensity for a first predetermined discrete time interval. At step 303, a step signal is detected. In some instances, the step signal includes detecting light having a pulse frequency that is different from the pulse frequency of light that is used to irradiate the photodetector at step 302. For example, the photodetector may be irradiated at a first frequency during the first time interval and the step signal includes detecting light that is at a different (e.g., greater) frequency from the first frequency. In other instances, the photodetector may be irradiated with a continuous wave light source during the first time interval and the step signal includes detecting pulsed light. At step 304, the photodetector is irradiated with the light source at a second intensity for a second predetermined discrete time interval. At step 305 the data signals from the photodetector are integrated over a time period that includes at least a part of the first time interval and the second time interval. Based on the integrated data signals, a signal amplitude from the photodetector is calculated at step 306. One or more parameters are determined at step 307 using the calculated signal amplitude, such as where the calculated signal amplitude is compared with the intensity of light during each irradiation interval. For example, using the comparison of the calculated signal amplitude with the light intensity during each irradiation interval, minimum detection threshold 307a, maximal detection threshold 307b, detector sensitivity 307c, detector dynamic range 307d, detector signal-to-noise ratio 307e or number of photoelectrons per unit output 307f can be determined.

Figure 3B:
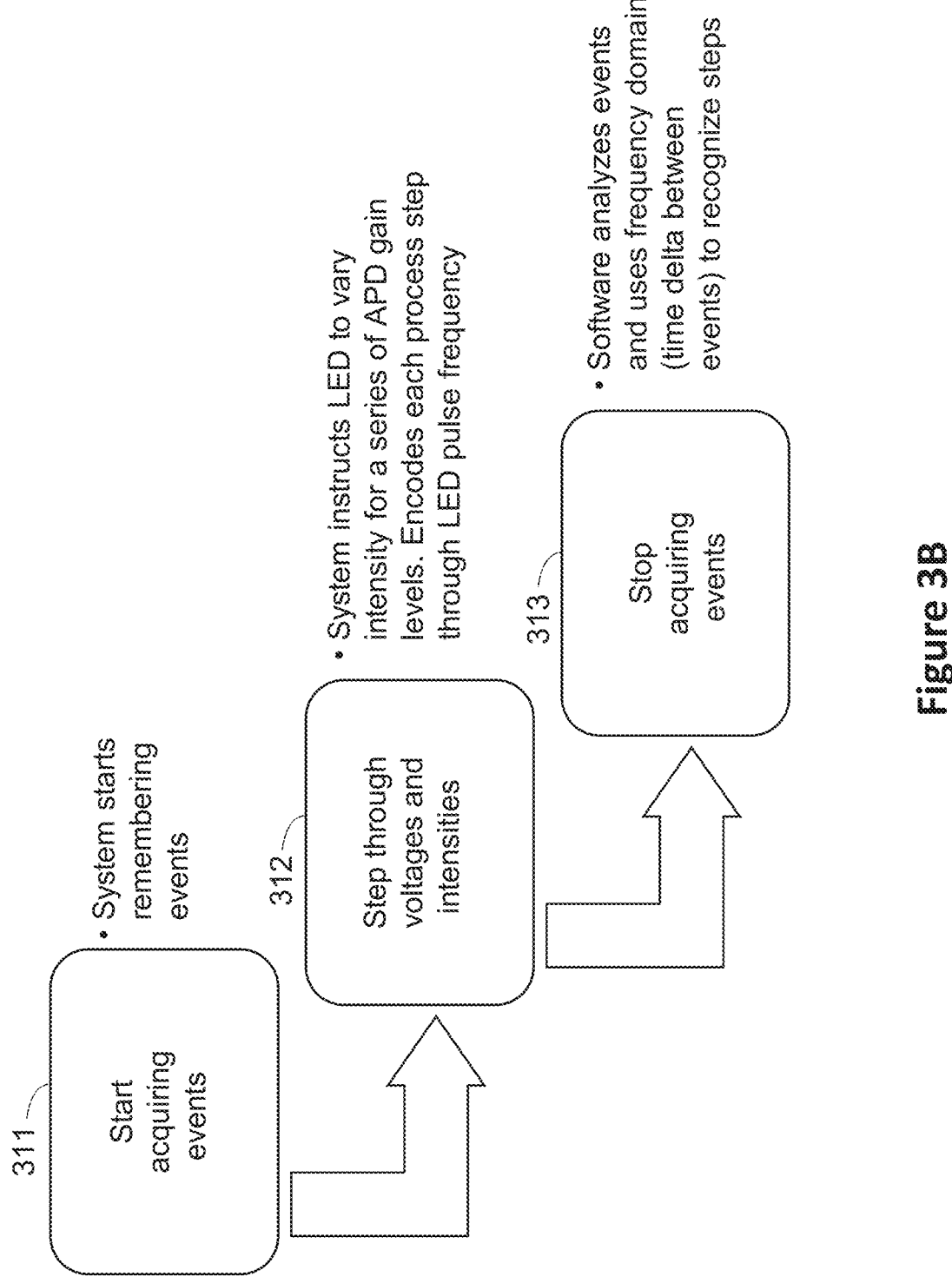

FIG. 3B depicts a flow chart of determining parameters of a photodetector for use in a particle analyzer according to certain embodiments. At step 311, the system is configured to instruct a light source to irradiate a photodetector to generate light signals. At step 312, the light source irradiates the photodetector over a plurality of steps of increased light intensity and voltage gains for the photodetector determine parameters of the photodetector. Each cycle of irradiation at step 312 may include a step signal which indicates a change in the intensity of the light source or a change in the detector gain of the photodetector. The step signal may be a change in the pulse frequency of the light source as described above. The system (as described in greater detail below) includes a processor with memory having software instructions for analyzing (step 313) each irradiation cycle and the determined parameters of the photodetector. One or more irradiation steps may be repeated or reacquired in order to optimize a desired parameter of the photodetector (e.g., photodetector sensitivity, detector dynamic range or detector signal-to-noise ratio).

Figure 3C:
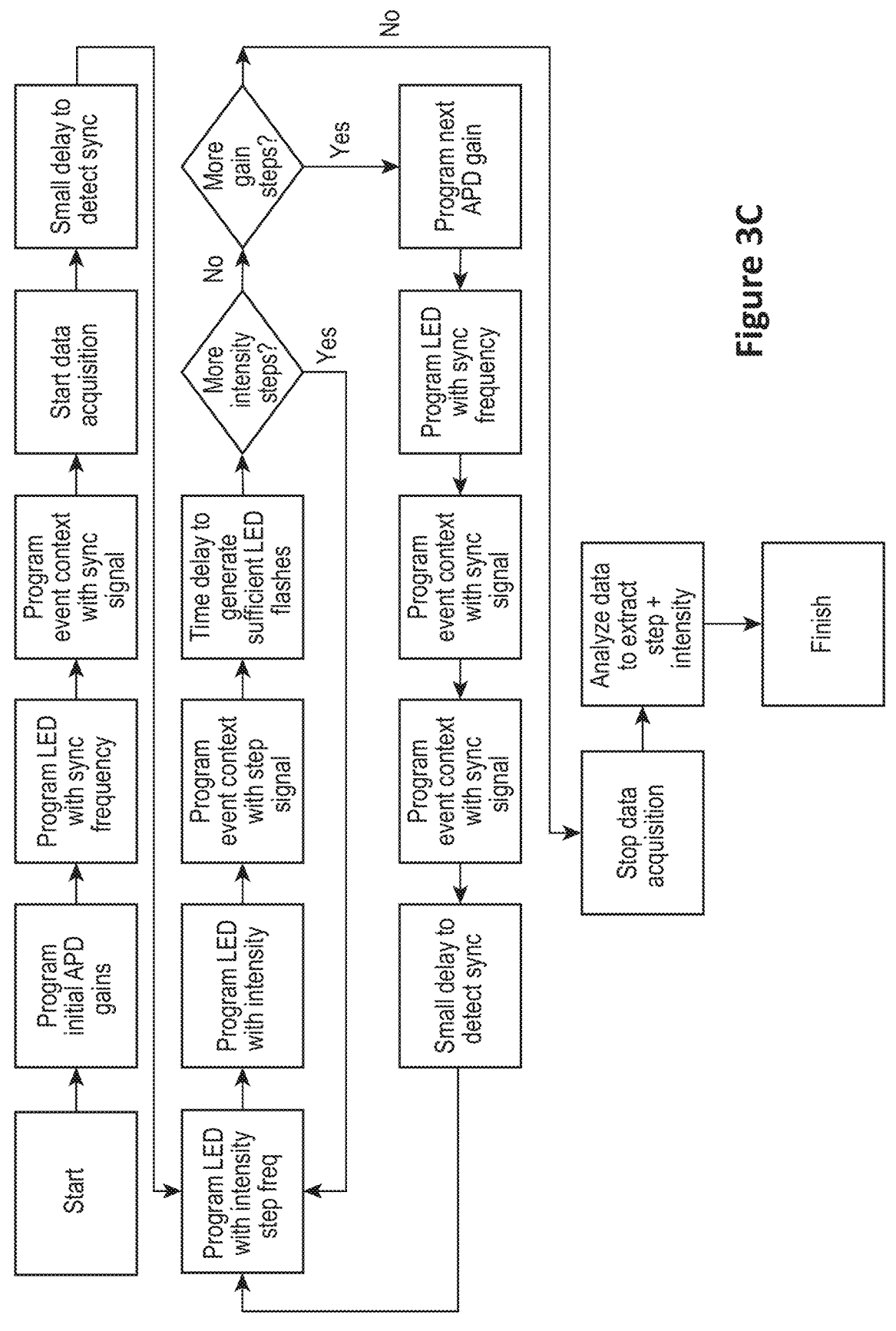

FIG. 3C depicts a flow chart for determining parameters of a photodetector of a particle analyzer according to certain embodiments. The detector gain of the photodetector (e.g., an avalanche photodiode, APD) is set to a first voltage level and the light source (LED) is set to a first frequency, synchronous with the first detector gain setting. A synchronization signal is detected by the photodetector from the light source and data acquisition is initiated. The light source is programmed to include changes in intensity (e.g., stepwise increases in intensity). The change in light intensity is encoded with a light pulse frequency change as a step signal. The light source then irradiates the photodetector for a predetermined duration of time to detect the programmed step signal. The intensity of the light source is changed and the photodetector detects light from the light source for a predetermined time interval at the new light intensity. These steps may be repeated 1 or more times through a plurality of light intensities, such as 2 or more times, 3 or more times, 4 or more times, 5 or more times, 10 or more times, 25 or more times and including 50 or more times to cycle through the desired number of light intensities. Each of the above steps may be repeated at different detector gains. In some embodiments, the steps depicted in FIG. 3C are repeated over the entire operating voltage range of the photodetector. The parameters of the photodetector may be determined based on the data signals acquired over the plurality of light intensities and detector gains measured.

In embodiments, methods include integrating data signals from the photodetector. In some embodiments, integrating the data signals from the photodetector includes integrating the data signals over 10% or more of the duration of each discrete interval of irradiation, such as 15% or more, such as 20% or more, such as 25% or more, such as 50% or more, such as 75% or more, such as 90% or more and including integrating the data signals over 99% of the duration of each discrete interval of irradiation. In some embodiments, data signals from the photodetector are integrated over the entire duration of each discrete time interval of irradiation according to the subject methods.

In some embodiments, methods include integrating data signals from the photodetector for a period of time that includes at least each of the discrete time intervals of irradiation at each different light intensity. For example, where the photodetector is irradiated by the light source over 50 or more discrete intervals, methods include integrating data signals from the photodetector for a period of time that includes at least a part of the duration of the 50 discrete time intervals. In some embodiments, methods include integrating data signals from the photodetector for a period of time that includes a duration before irradiation of the photodetector according to the subject methods, such as to measure a noise component to the photodetector signal. In these embodiments, methods include integrating data signals from the photodetector for 0.001 ms or more before irradiation of the photodetector, such as for 0.005 ms or more, such as for 0.01 ms or more, such as for 0.05 ms or more, such as for 0.1 ms or more, such as for 0.5 ms or more, such as for 1 ms or more, such as for 2 ms or more, such as for 3 ms or more, such as for 4 ms or more, such as for 5 ms or more, such as for 10 ms or more, such as for 25 ms or more, such as for 50 ms or more, such as for 100 ms or more and including for 250 ms or more before irradiation of the photodetector. In other embodiments, methods include integrating data signals from the photodetector after the last discrete time interval of irradiation, such as for 0.005 ms or more, such as for 0.01 ms or more, such as for 0.05 ms or more, such as for 0.1 ms or more, such as for 0.5 ms or more, such as for 1 ms or more, such as for 2 ms or more, such as for 3 ms or more, such as for 4 ms or more, such as for 5 ms or more, such as for 10 ms or more, such as for 25 ms or more, such as for 50 ms or more, such as for 100 ms or more and including for 250 ms or more.

Integrating data signals from the photodetector in certain embodiments includes calculating a signal amplitude over the period of time. In some instances, calculating the signal amplitude includes calculating the median signal amplitude. In certain instances, methods also include comparing the calculated signal amplitude with the light intensity of the light source. Based on one or more of the calculated signal amplitude and the comparison between the calculated signal amplitude with the light intensity of the light source, a parameter of the photodetector is calculated. For instance, methods may include determining for the photodetector a parameter such as minimum detection threshold, maximal detection threshold, detector sensitivity (i.e., ratio of detector output to detector input), detector dynamic range (range of detector signal from minimum to maximal detection thresholds), detector signal-to-noise ratio or number of photoelectrons per unit output.

Each of the detector parameters may be determined over a range of operating voltages of the photodetector. In some embodiments, the parameter is determined based on the calculated signal amplitude over 10% or more of the operating voltages of the photodetector, such as 15% or more, such as 20% or more, such as 25% or more, such as 50% or more, such as 75% or more, such as 90% or more and determining the parameter over 99% or more of the operating voltages of the photodetector. In certain instances, each of the parameters may be determined over the entire operating voltage range of the photodetector.

In certain instances, parameters of the photodetector may be adjusted based on one or more of the calculated signal amplitude or comparison between the calculated signal amplitude and the intensity of irradiation during each discrete time interval. The term "adjusting" is used herein in its conventional sense to refer to changing one or more functional parameters of the photodetector. For example, adjusting the photodetector may include increasing or decreasing a photodetector voltage gain. In certain embodiments, adjusting one or more parameters of the photodetector based on the calculated signal amplitude or comparison between the calculated signal amplitude and the intensity of irradiation during each discrete time interval of interest may be fully automated, such that the adjustments made require little to no human intervention or manual input by the user.

Systems for Determining a Parameter of a Photodetector

Aspects of the present disclosure also include systems having a light source and a photodetector that is configured to detect light from the light source at different irradiation intensities for predetermined time intervals. In embodiments, systems include a light source and a photodetector that is configured to detect light from the light source for a first predetermined time interval, detect a step signal that indicates a change in a parameter of the light source or a parameter of the photodetector, detect light from the light source for a second predetermined time interval and a processor having memory operably coupled to the processor such that the memory includes instructions stored thereon, which when executed by the processor, cause the processor to integrate data signals from the photodetector over the first predetermined time interval and the second predetermined time interval and determine one or more parameters of the photodetector based on the integrated data signals.

In some embodiments, the system is configured to irradiate the photodetector for one or more predetermined time intervals with a pulsed light source. In embodiments, the light source may be any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, the light source is a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a pulsed light source. As described above, the term "pulsed light source" is used herein in its conventional sense to refer to a source of light which emits light at predetermined time intervals, each time interval having a predetermined irradiation duration (i.e., pulse width). In certain embodiments, the pulsed light source is configured to irradiate the photodetector with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In certain embodiments, the light source is a continuous wave light source. The term "continuous wave light source" refers to a source of light which provides uninterrupted light flux and maintains irradiation of the photodetector with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

In some embodiments, the light source emits light having wavelengths that overlap, such as where the output spectrum of one or more components of the lights source overlap by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more. In some embodiments, the wavelengths of light emitted by the light sources exhibit no overlap. For example, the output spectrum of the light sources may be separated by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more.

In systems of interest, the light source may be positioned any suitable distance from the photodetector, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the photodetector may be positioned at any suitable angle to the light source such as at an angle ranging from 10° to 90°, such as from 15° to 85°, such as from 20° to 80°, such as from 25° to 75° and including from 30° to 60°, for example at a 90° angle.

Light sources according to certain embodiments may also include one or more optical adjustment components. The term "optical adjustment" is used herein in its conventional sense to refer to any device that is capable of changing the spatial width of irradiation or some other characteristic of irradiation from the light source, such as for example, irradiation direction, wavelength, beam width, beam intensity and focal spot. Optical adjustment protocols may be any convenient device which adjusts one or more characteristics of the light source, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics.

Where the optical adjustment component is configured to move, the optical adjustment component may be configured to be moved continuously or in discrete intervals. In some embodiments, movement of the optical adjustment component is continuous. In other embodiments, the optical adjustment component is movable in discrete intervals, such as for example in 0.01 micron or greater increments, such as 0.05 micron or greater, such as 0.1 micron or greater, such as 0.5 micron or greater, such as 1 micron or greater, such as 10 micron or greater, such as 100 microns or greater, such as 500 microns or greater, such as 1 mm or greater, such as 5 mm or greater, such as 10 mm or greater and including 25 mm or greater increments.

Any displacement protocol may be employed to move the optical adjustment component structures, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

Photodetectors of the subject systems may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, the photodetector may be configured to detect light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths.

In embodiments, photodetectors may be configured to measure light continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light from the light source one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

In some embodiments, the light source is configured for irradiating for two or more discrete time intervals, each time interval being at a different irradiation intensity. In some embodiments, the light source is configured for irradiation at a particular intensity for time intervals of 0.1 ms or more, such as for 0.5 ms or more, such as for 1.0 ms or more, such as for 5 ms or more, such as for 10 ms or more, such as for 20 ms or more, such as for 30 ms or more, such as for 40 ms or more, such as for 50 ms or more, such as for 60 ms or more, such as for 70 ms or more, such as for 80 ms or more, such as for 90 ms or more and including for 100 ms or more. For instance, the light source may be configured for irradiation at a particular light intensity of 50 ms.

In certain embodiments, each predetermined time interval for irradiating the photodetector is the same duration. In other embodiments, each predetermined time interval is different. In certain embodiments, systems are configured to irradiate the photodetector with the light source over a plurality of discrete time intervals, such as 3 or more discrete time intervals, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 75 or more and including 100 or more discrete time intervals. In some embodiments, each of the plurality of time intervals is the same duration. In other embodiments, each of the plurality of time intervals is a different duration. In still other embodiments, some of the time intervals may be the same duration and some of the time intervals may be a different duration.

In some embodiments, the intensity of irradiation by the light source is substantially constant for the duration of each predetermined time interval, such as where the intensity of irradiation varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the intensity of irradiation by the light source varies by 0.000001% or less for the duration of the predetermined time interval.

Systems of interest include a processor having memory operably coupled to the processor where the memory includes instructions stored thereon, which when executed by the processor, cause the processor to detect a step signal, that indicates a change in a parameter of the light source or a parameter of the photodetector. In some instances, the step signal includes a change in the frequency of light pulses from the light source. In some embodiments, the light source is a continuous wave light source and the step signal includes one or more pulses of light.

In some embodiments, the step signal includes a change in the frequency of light pulses by the light source. In some instances, the frequency of light pulses is increased, such as where the frequency is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including increasing the frequency of light pulses by 5-fold or more. For example, the frequency of the light pulses may be increased by 0.0001 kHz or more, such as by 0.0005 kHz or more, such as by 0.001 kHz or more, such as by 0.005 kHz or more, such as by 0.01 kHz or more, such as by 0.05 kHz or more, such as by 0.1 kHz or more, such as by 0.5 kHz or more, such as by 1 kHz or more, such as by 2.5 kHz or more, such as by 5 kHz or more, such as by 10 kHz or more, such as by 25 kHz or more, such as by 50 kHz or more and including increasing the frequency of the light pulses by 100 kHz or more. In other instances, the step signal includes a decrease in the frequency of light pulses by the light source, such as where the frequency is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including decreasing the frequency of light pulses by 5-fold or more. For example, the frequency of the light pulses may be decreased by 0.0001 kHz or more, such as by 0.0005 kHz or more, such as by 0.001 kHz or more, such as by 0.005 kHz or more, such as by 0.01 kHz or more, such as by 0.05 kHz or more, such as by 0.1 kHz or more, such as by 0.5 kHz or more, such as by 1 kHz or more, such as by 2.5 kHz or more, such as by 5 kHz or more, such as by 10 kHz or more, such as by 25 kHz or more, such as by 50 kHz or more and including decreasing the frequency of the light pulses by 100 kHz or more.

In some embodiments, the step signal includes a change in the duration of light pulses by the light source. In some instances, the duration of light pulses is increased, such as where the duration is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including increasing the duration of light pulses by 5-fold or more. For example, the duration of the light pulses may be increased by 0.0001 ms or more, such as by 0.0005 ms or more, such as by 0.001 ms or more, such as by 0.005 ms or more, such as by 0.01 ms or more, such as by 0.05 ms or more, such as by 0.1 ms or more, such as by 0.5 ms or more, such as by 1 ms or more, such as by 2.5 ms or more, such as by 5 ms or more, such as by 10 ms or more, such as by 25 ms or more, such as by 50 ms or more and including increasing the frequency of the light pulses by 100 ms or more. In other instances, the step signal includes a decrease in the duration of light pulses by the light source, such as where the duration is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including decreasing the duration of light pulses by 5-fold or more. For example, the duration of the light pulses may be decreased by 0.0001 ms or more, such as by 0.0005 ms or more, such as by 0.001 ms or more, such as by 0.005 ms or more, such as by 0.01 ms or more, such as by 0.05 ms or more, such as by 0.1 ms or more, such as by 0.5 ms or more, such as by 1 ms or more, such as by 2.5 ms or more, such as by 5 ms or more, such as by 10 ms or more, such as by 25 ms or more, such as by 50 ms or more and including decreasing the frequency of the light pulses by 100 ms or more. In certain embodiments, the step signal is an absence of light from the lights source.

In some embodiments, the step signal indicates a change in an intensity of light from the light source. In some instances, the change in intensity is a decrease in the light intensity from the light source. For example, the step signal may indicate a decrease in intensity of the light source, such as where the intensity of light emitted by the light source is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates a decrease in the intensity of light from the light source by 5-fold or more. In other instances, the change in intensity is an increase in the light intensity from the light source. For example, the step signal may indicate an increase in intensity of the light source, such as where the intensity of light emitted by the light source is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates an increase in the intensity of light from the light source by 5-fold or more.

In other embodiments, the step signal indicates a change in a spectrum parameter of light emitted by the light source. In some instances, the change in spectrum parameter is a change in the wavelength of light emitted by the light source. In one example, the light source is a monochromatic light source and the step signal indicates a change from a first wavelength of light from the light source to a second wavelength of light. In another example, the light source includes plurality of monochromatic light sources and the step signal indicates a change in one more of the wavelengths of light of the plurality of monochromatic light sources, such as where the wavelength of light is changed for 5% or more of the plurality of light sources, such as 10% or more, such as 20% or more, such as 30% or more, such as 40% or more, such as 50% or more, such as 60% or more, such as 70% or more, such as 80% or more, such as 90% or more and including where all of the wavelengths of light from the plurality of light sources are changed.

In other instances, the change in spectrum parameter is a change in the number of wavelengths of light emitted by the light source. For example, the change in spectrum parameter may include an increase in the number of wavelengths emitted by the light source. In certain instances, the number of wavelengths emitted by the light source may be increased by 5% or more, such as by 10% or more, such as by 20% or more, such as by 30% or more, such as by 40% or more, such as by 50% or more, such as by 60% or more, such as by 70% or more, such as by 80% or more, such as by 90% or more, such as by 1.5 fold or more, such as by 2-fold or more, such as by 3-fold or more, such as by 4-fold or more, such as by 5-fold or more and including by 10-fold or more. In other embodiments, the change in spectrum parameter includes a decrease in the number of wavelengths emitted by the light source. In certain instances, the number of wavelengths emitted by the light source may be decreased by 5% or more, such as by 10% or more, such as by 20% or more, such as by 30% or more, such as by 40% or more, such as by 50% or more, such as by 60% or more, such as by 70% or more, such as by 80% or more, such as by 90% or more, such as by 1.5 fold or more, such as by 2-fold or more, such as by 3-fold or more, such as by 4-fold or more, such as by 5-fold or more and including by 10-fold or more.

In some embodiments, the change in the number of wavelengths of light emitted by the light source includes a change in the spectral width emitted by the light source. In some instances, the spectral width emitted by the light source may be increased by 5 nm or more, such as by 10 nm or more, such as by 25 nm or more, such as by 50 nm or more, such as by 100 nm or more, such as by 250 nm or more and including by 500 nm or more. In other instances, the spectral width emitted by the light source may be decreased by 5 nm or more, such as by 10 nm or more, such as by 25 nm or more, such as by 50 nm or more, such as by 100 nm or more, such as by 250 nm or more and including by 500 nm or more.

In some embodiments, the step signal indicates a change in a parameter of the photodetector. In certain embodiments, the parameter is a change in the detector gain of the photodetector. In some instances, the change in detector gain is a decrease in the detector gain of the photodetector. For example, the example, the step signal may indicate a decrease in the detector gain of the photodetector, such as where the detector gain of the photodetector is decreased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates a decrease in the intensity of light from the light source by 5-fold or more. In certain instances, the step signal indicates a decrease in the detector gain by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 5 mV or more, such as by 10 mV or more, such as by 25 mV or more, such as by 50 mV or more, such as by 100 mV or more, such as by 250 mV or more, such as by 500 mV or more, such as by 1000 mV or more, such as by 2500 mV or more and including by 5000 mV or more. In certain embodiments, the step signal indicates a decrease in the detector gain by 1 V or more, such as by 2 V or more, such as by 5 V or more, such as by 10 V or more, such as by 25 V or more, such as by 50 V or more, such as by 100 V or more, such as by 200 V or more, such as by 300 V or more, such as by 400 V or more, such as by 500 V or more and including by 600 V or more.

In other embodiments, the step signal indicates an increase in the detector gain of the photodetector, such as where the detector gain of the photodetector is increased by 5% or more, such as by 10% or more, such as 25% or more, such as by 50% or more, such as by 75% or more, such as by 90% or more, such as by 95% or more, such as by 1.5-fold or more, such as by 2-fold or more, such as by 3-fold or more, such as by 4-fold or more and including where the step signal indicates an increase in the intensity of light from the light source by 5-fold or more. In certain instances, the step signal indicates an increase in the detector gain by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 5 mV or more, such as by 10 mV or more, such as by 25 mV or more, such as by 50 mV or more, such as by 100 mV or more, such as by 250 mV or more, such as by 500 mV or more, such as by 1000 mV or more, such as by 2500 mV or more and including by 5000 mV or more. In certain embodiments, the step signal indicates an increase in the detector gain by 1 V or more, such as by 2 V or more, such as by 5 V or more, such as by 10 V or more, such as by 25 V or more, such as by 50 V or more, such as by 100 V or more, such as by 200 V or more, such as by 300 V or more, such as by 400 V or more, such as by 500 V or more and including by 600 V or more.

In certain embodiments, the memory includes instructions for detecting a synchronization signal. In some embodiments, the memory includes instructions for detecting a synchronization signal that indicates that light from the light source is detected having a predetermined pulse frequency. In other embodiments, the memory includes instructions for detecting a synchronization signal that indicates that light from the light source is detected having an intensity that exceeds a predetermined intensity threshold. In other embodiments the memory includes instructions for detecting a synchronization signal that indicates that light detected from the light source is at a maximum light intensity.

In embodiments, systems also include a processor having memory operably coupled to the processor wherein the memory includes instructions stored thereon, which when executed by the processor, cause the processor to integrate data signals from the photodetector over a period of time that includes at least a part of each of the discrete irradiation intervals and determine one or more parameters of the photodetector based on the integrated data signals. In certain embodiments, the memory includes instructions which when executed by the processor, cause the processor to calculate the median signal amplitude. In certain embodiments, systems include a processor having memory operably coupled to the processor wherein the memory includes instructions stored thereon, which when executed by the processor, cause the processor to compare the calculated signal amplitude with the light intensity of the light source.

In some embodiments, systems include a processor having memory operably coupled to the processor wherein the memory includes instructions stored thereon, which when executed by the processor, cause the processor to compare the calculated signal amplitude with the light intensity of the light source. Based on one or more of the calculated signal amplitude and the comparison between the calculated signal amplitude with the light intensity of the light source, systems of interest include memory having instructions for calculating a parameter of the photodetector. For instance, the memory may include instructions for determining for the photodetector a parameter such as minimum detection threshold, maximal detection threshold, detector sensitivity (i.e., ratio of detector output to detector input), detector dynamic range (range of detector signal from minimum to maximal detection thresholds), detector signal-to-noise ratio or number of photoelectrons per unit output. In some embodiments, the memory includes instructions for determining the photodetector parameters over a range of the operating voltages of the photodetector. In certain embodiments, the memory includes instructions for calculating signal amplitude of the photodetector over 10% or more of the operating voltages of the photodetector, such as 15% or more, such as 20% or more, such as 25% or more, such as 50% or more, such as 75% or more, such as 90% or more and determining the parameter over 99% or more of the operating voltages of the photodetector. In certain instances, the memory includes instructions for calculating signal amplitude of the photodetector over the entire operating voltage range of the photodetector.

In certain embodiments, the photodetector is a photodetector that is positioned in a particle analyzer, such as a particle sorter. In certain embodiments, the subject systems are flow cytometric systems that includes the photodetector as part of a light detection system for detecting light emitted by a sample in a flow stream. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSR-Fortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040;

5,620,842; 5,602,039; the disclosure of which are herein incorporated by reference in their entirety.

In certain embodiments, the subject systems are flow cytometric systems having an excitation module that uses radio-frequency multiplexed excitation to generate a plurality of frequency shifted beams of light. In certain instances, the subject systems are flow cytometric systems as described in U.S. Pat. Nos. 9,423,353 and 9,784,661 and U.S. Patent Publication Nos. 2017/0133857 and 2017/0350803, the disclosures of which are herein incorporated by reference.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. Provisional Patent Application No. 62/803,264, filed on Feb. 8, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

Figure 4A:
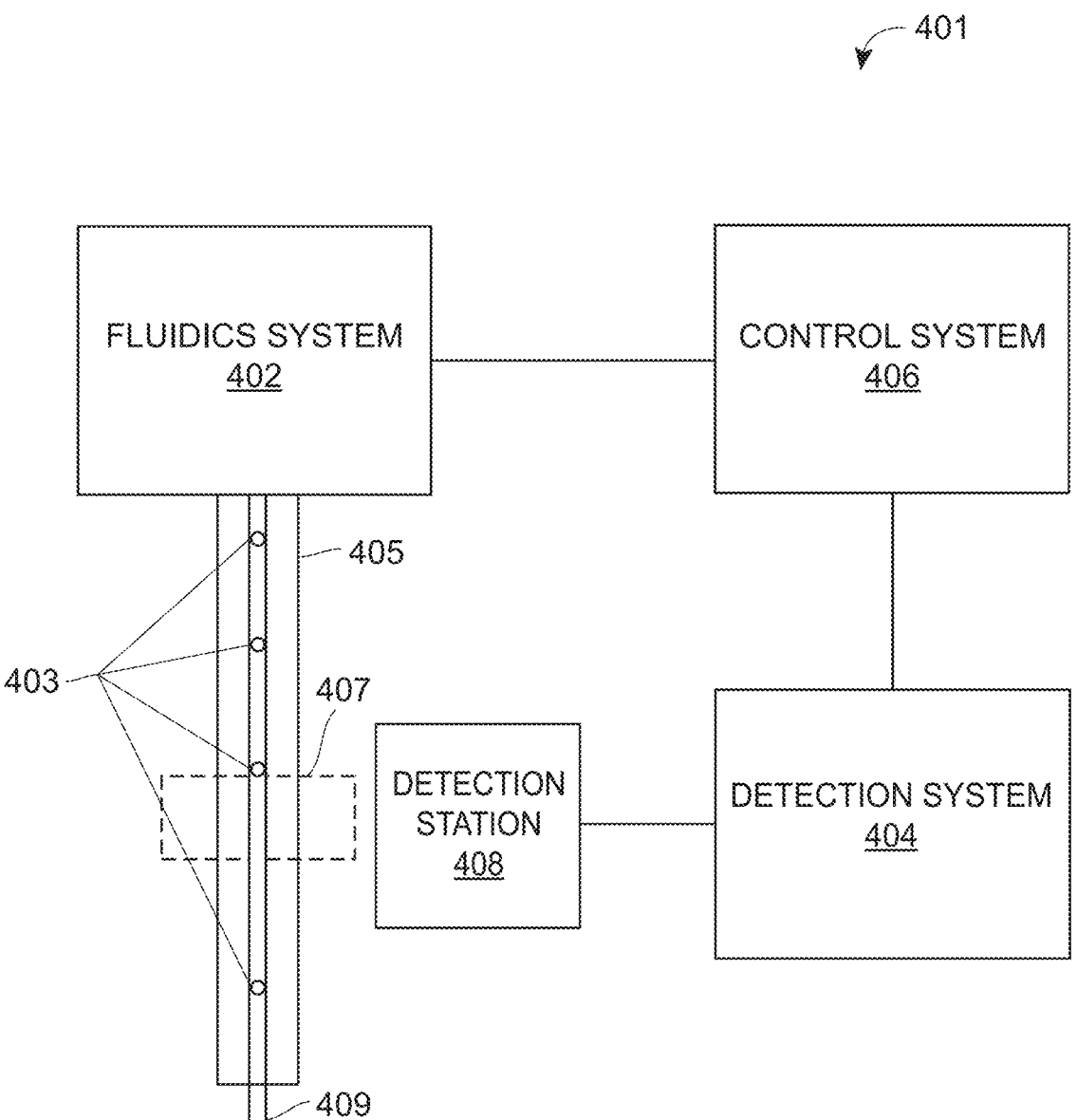
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
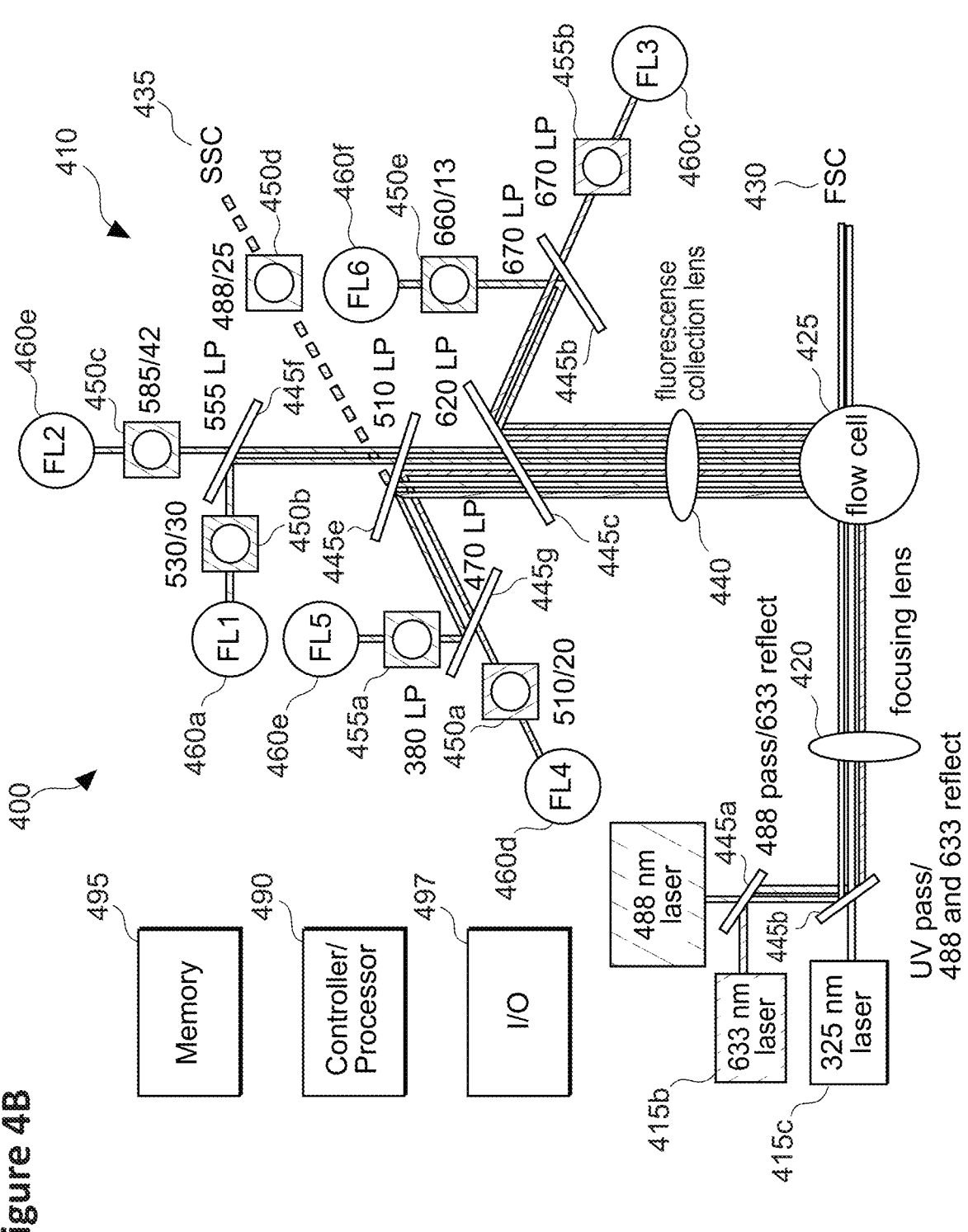
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
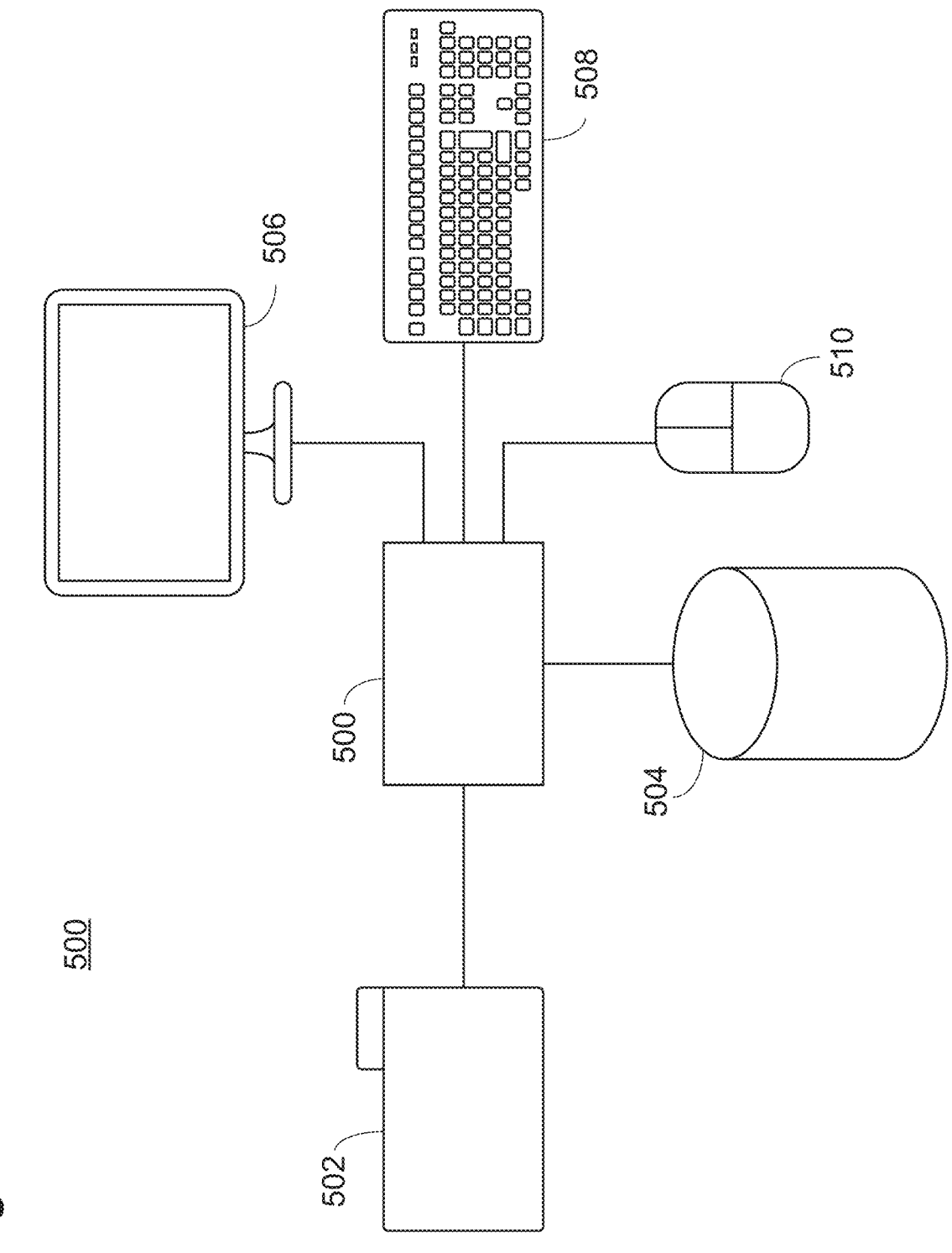
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer 502 can be configured to acquire biological event data. For example, a flow cytometer can generate flow cytometric event data. The particle analyzer 502 can be configured to provide biological event data to the analytics controller 500. A data communication channel can be included between the particle analyzer 502 and the analytics controller 500. The biological event data can be provided to the analytics controller 500 via the data communication channel.

The analytics controller 500 can be configured to receive biological event data from the particle analyzer 502. The biological event data received from the particle analyzer 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample. Computer-Controlled Systems Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for detecting light from a light source with a photodetector in a particle analyzer for a first predetermined time interval, instructions for detecting a step signal that indicates a change in a parameter of the light source or a parameter of the photodetector, instructions for detecting light from the light source with the photodetector for a second predetermined time interval, instructions for integrating data signals from the photodetector over the first predetermined time interval and the second predetermined time interval and instructions for determining one or more parameters of the photodetector based on the integrated data signals.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise.

They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 6:
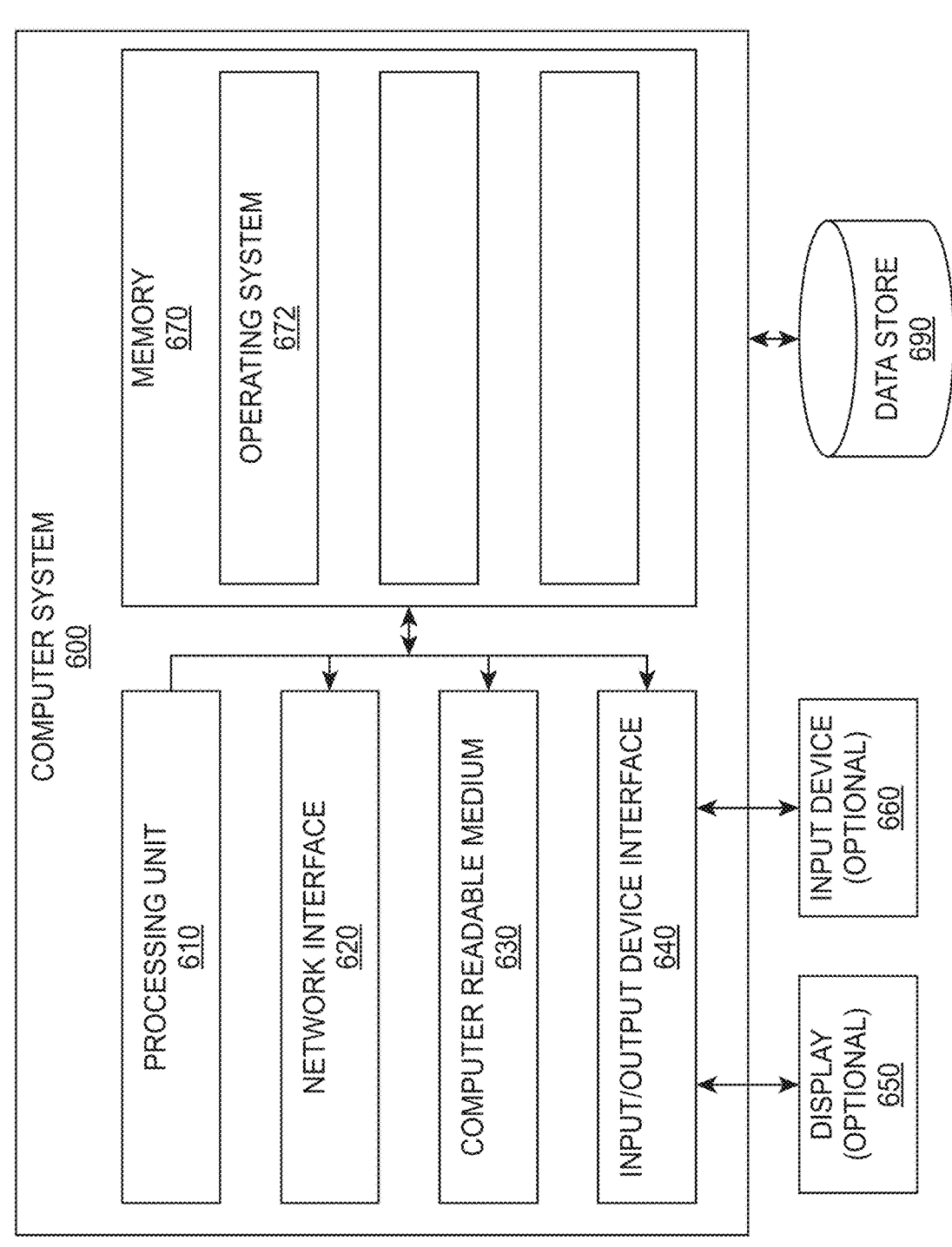
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure. Computer-Readable Storage Medium Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-ft magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having: algorithm for detecting light from a light source with a photodetector in a particle analyzer for a first predetermined time interval, algorithm for detecting a step signal that indicates a change in a parameter of the light source or a parameter of the photodetector, algorithm for detecting light from the light source with the photodetector for a second predetermined time interval, algorithm for integrating data signals from the photodetector over the first predetermined time interval and the second predetermined time interval and algorithm for determining one or more parameters of the photodetector based on the integrated data signals.

In certain instances, the non-transitory computer readable storage medium includes algorithm for detecting light from the light source over a plurality of predetermined time intervals. In some instances, the intensity of the light source is increased in intensity after each predetermined time interval. The time interval for detecting light from the light source by the photodetector at each light intensity may vary. In some instances, each time interval is the same. In other instances, each time interval is different. In these instances, the non-transitory computer readable storage medium includes algorithm for integrating data signals from the photodetector over a time period that includes the plurality of irradiation time intervals.

In some embodiments, the non-transitory computer readable storage medium includes algorithm for detecting a step signal that indicates a change in an intensity of light from the light source. In some instances, the change in intensity is a decrease in the light intensity from the light source. In other instances, the change in intensity is an increase in the light intensity from the light source. In other embodiments, the non-transitory computer readable storage medium includes algorithm for detecting a step signal that indicates a change in a spectrum parameter of light from the light source. In some instances, the change in spectrum parameter is a change in the wavelength of light emitted by the light source. In other instances, the change in spectrum parameter is an increase in the number of wavelengths of light emitted by the light source. In certain instances, the increase in the number of wavelengths of light includes an increase in the spectral width emitted by the light source. In other instances, the change in spectrum parameter is a decrease in the number of wavelengths of light emitted by the light source. In certain instances, the decrease in the number of wavelengths of light includes a decrease in the spectral width emitted by the light source.

In some instances, the non-transitory computer readable storage medium includes algorithm for detecting a step signal that includes a change in the frequency of light pulses from the light source. In certain instances, the non-transitory computer readable storage medium includes algorithm for detecting a step signal that includes detecting pulses of light from the light source. In other instances, the non-transitory computer readable storage medium includes algorithm for detecting a step signal that includes detecting an increase in the frequency of light pulses as compared to light pulses from the light source detected during the first predetermined time interval. In other instances, the non-transitory computer readable storage medium includes algorithm for detecting a step signal that includes detecting a decrease in the frequency of light pulses as compared to light pulses from the light source detected during the first predetermined time interval. In certain instances, the non-transitory computer readable storage medium includes algorithm for detecting a step signal that includes detecting an absence of light from the light source.

In some embodiments, the non-transitory computer readable storage medium includes algorithm for detecting a step signal that indicates a change in the detector gain of the photodetector. In some instances, the change in detector gain is a decrease in the detector gain of the photodetector. In other instances, the change in detector gain is an increase in the detector gain of the photodetector. In certain embodiments, a change in the detector gain is indicated by a step signal that includes a change in the frequency of light pulses from the light source. In other embodiments, a change in the detector gain is indicated by a step signal that includes an absence of light from the light source.

In certain embodiments, the non-transitory computer readable storage medium includes algorithm for detecting a synchronization signal before detecting light from the light source before the first predetermined time interval. In some embodiments, the synchronization signal includes detecting light from the light source having a predetermined pulse frequency. In other embodiments, the synchronization signal includes detecting light from the light source having an intensity that exceeds a predetermined intensity threshold. In other embodiments, the synchronization signal includes detecting light from the light source at a maximum light intensity.

In some embodiments, the non-transitory computer readable storage medium includes algorithm for calculating a signal amplitude. In some instances, the non-transitory computer readable storage medium includes algorithm for calculating the median signal amplitude. In certain instances, the non-transitory computer readable storage medium includes algorithm for comparing the calculated signal amplitude with the light intensity of the light source. In certain instance, the non-transitory computer readable storage medium includes algorithm for determining a parameter of the photodetector based on one or more of the calculated signal amplitude and the comparison between the calculated signal amplitude with the light intensity of the light source. For example, the non-transitory computer readable storage medium may include algorithm for determining detector sensitivity, minimum detection threshold, maximal detection threshold, detector sensitivity, detector dynamic range, detector signal-to-noise ratio or number of photoelectrons per unit output. The non-transitory computer readable storage medium may include algorithm for determining the detector parameter over a range of operating voltages of the photodetector, such as where the parameters of the photodetector are determined over the entire operating voltage range of the photodetector.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Kits including one or more components of the subject systems are also provided. Kits according to certain embodiments include one or more light source, such as a narrow band light emitting diode and a photodetector (e.g., a photomultiplier tube) where analysis of one or more parameters of the photodetector is desired. Kits may also include an optical adjustment component, such as lenses, mirrors, filters, fiber optics, wavelength separators, pinholes, slits, collimating protocols and combinations thereof.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to calibrate or optimize a photodetector, such as in a particle analyzer. The subject methods and systems also find use for photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
irradiating with a light source a photodetector in a particle analyzer with pulses of light for a first predetermined time interval;
irradiating the photodetector with pulses of light for a second predetermined time interval;
detecting a step signal based on a change in the frequency of the pulses of light measured by the photodetector between the first predetermined time interval and the second predetermined time interval;
irradiating the photodetector with pulses of light for a third predetermined time interval at an intensity different from the intensity during the first predetermined time interval; and
calibrating response linearity of the photodetector based on the detected step signal and the light measured during the third predetermined time interval.

2. The method according to claim 1, wherein the step signal comprises an increase in the intensity of light outputted from the light source.

3. The method according to claim 1, wherein the step signal comprises a change of a spectrum of light from the light source.

4. The method according to claim 1, wherein the light source comprises one or more light emitting diodes.

5. The method according to claim 4, wherein the light source comprises a plurality of monochromatic light emitting diodes.

6. The method according to claim 4, wherein the light source comprises a plurality of polychromatic light emitting diodes.

7. The method according to claim 1, wherein detecting the step signal indicates that there will be a change in the intensity of light from the light source.

8. The method according to claim 7, wherein detecting the step signal indicates that there will be an increase in the intensity of light from the light source from a first intensity to a second intensity.

9. The method according to claim 7, wherein the step signal comprises a change in the frequency of light pulses from the light source.

10. The method according to claim 1, wherein the method further comprises detecting a synchronization signal before the first predetermined time interval.

11. The method according to claim 1, wherein the method comprises detecting a tag signal that is inserted into data signals generated by the photodetector during one or more of the first predetermined time interval and the second predetermined time interval.

12. The method according to claim 1, wherein the method further comprises setting the photodetector to a predetermined detector gain before the first predetermined time interval.

13. The method according to claim 1, wherein the photodetector is positioned in a flow cytometer.

14. A particle analyzer comprising:

a light source configured to irradiate with pulses of light for a first predetermined time interval and with pulses of light for a second predetermined time interval and pulses of light for a third predetermined time interval at an intensity different from the intensity during the first predetermined time interval;

a light detection system positioned in a housing of the particle analyzer, the light detection system comprising a photodetector configured to:

detect a step signal based on a change in the frequency of the pulses of light measured by the photodetector between the first predetermined time interval and the second predetermined time interval; and a processor comprising memory operably coupled to the processor wherein the memory comprises instructions stored thereon, which when executed by the processor, cause the processor to:

calibrate response linearity of the photodetector based on the detected step signal and the light measured during the third predetermined time interval.

* * * * *